US010218721B1

United States Patent
Khanna et al.

(10) Patent No.: US 10,218,721 B1
(45) Date of Patent: Feb. 26, 2019

(54) REAL-TIME REGULAR EXPRESSION SEARCH ENGINE

(71) Applicant: Redberry Systems, Inc., Los Altos Hills, CA (US)

(72) Inventors: Sandeep Khanna, Los Altos, CA (US); Varadarajan Srinivasan, Los Altos Hills, CA (US); Madhavan Bakthavatchalam, Fremont, CA (US)

(73) Assignee: Redberry Systems, Inc., Los Altos Hills, CA (US)

( * ) Notice: Subject to any disclaimer, the term of this patent is extended or adjusted under 35 U.S.C. 154(b) by 0 days.

(21) Appl. No.: 15/944,596

(22) Filed: Apr. 3, 2018

Related U.S. Application Data

(63) Continuation of application No. 15/832,714, filed on Dec. 5, 2017, now Pat. No. 9,967,272.

(51) Int. Cl.
*H04L 29/06* (2006.01)
*G06F 17/30* (2006.01)

(52) U.S. Cl.
CPC .... *H04L 63/1416* (2013.01); *G06F 17/30864* (2013.01); *H04L 63/1425* (2013.01); *H04L 63/20* (2013.01)

(58) Field of Classification Search
CPC . H04L 63/1416; H04L 63/1425; H04L 63/20; G06F 17/30864
See application file for complete search history.

(56) References Cited

U.S. PATENT DOCUMENTS

| 6,952,425 B1 | 10/2005 | Nelson | |
|---|---|---|---|
| 7,134,143 B2 * | 11/2006 | Stellenberg | H04L 63/0263 726/25 |
| 7,225,188 B1 * | 5/2007 | Gai | G06F 17/30982 |
| 7,613,669 B2 * | 11/2009 | Shin | G06F 17/30949 706/46 |
| 7,636,717 B1 * | 12/2009 | Gupta | G06F 17/30985 |
| 7,643,353 B1 | 1/2010 | Srinivasan et al. | |
| 7,656,716 B1 | 2/2010 | Srinivasan et al. | |
| 7,660,140 B1 | 2/2010 | Joshi et al. | |
| 7,821,844 B2 | 10/2010 | Srinivasan et al. | |
| 7,826,242 B2 | 11/2010 | Joshi et al. | |

(Continued)

OTHER PUBLICATIONS

"PERL—Regular Expressions," available for download at least prior to Dec. 5, 2017 from https://www.tutorialspoint.com/perl/, pp. 1-20, tutorialspoint.com.

(Continued)

*Primary Examiner* — Darren B Schwartz
(74) *Attorney, Agent, or Firm* — Charles Shemwell

(57) ABSTRACT

Upon receiving malware detection rules that are to be identified with respect to an input traffic stream, a sequence of state definitions are generated for each of the rules. The state definitions for each rule correspond to respective segments of the rule and specify conditions under which a state machine is to transition between search states corresponding to those segments, at least one of the segments corresponding to multiple characters within the input traffic stream. A state machine transitions between search states corresponding to one or more of the rules in accordance with contents of the input traffic stream and the conditions specified by the sequence of state definitions.

20 Claims, 9 Drawing Sheets

(56) References Cited

U.S. PATENT DOCUMENTS

| | | | |
|---|---|---|---|
| 7,853,578 B1* | 12/2010 | Anker | G06F 7/02 707/706 |
| 7,876,590 B2 | 1/2011 | Joshi et al. | |
| 7,881,125 B2 | 2/2011 | Srinivasan et al. | |
| 7,907,432 B2 | 3/2011 | Deshpande et al. | |
| 7,916,510 B1 | 3/2011 | Starovoitov et al. | |
| 7,924,589 B1 | 4/2011 | Srinivasan et al. | |
| 7,924,590 B1 | 4/2011 | Starovoitov et al. | |
| 8,023,300 B1 | 9/2011 | Srinivasan et al. | |
| 8,023,301 B1 | 9/2011 | Srinivasan et al. | |
| 8,031,503 B1 | 10/2011 | Gyllenhammer et al. | |
| 8,051,085 B1* | 11/2011 | Srinivasan | H04L 63/1416 707/737 |
| 8,111,533 B2 | 2/2012 | Gyllenhammer et al. | |
| 8,369,121 B2 | 2/2013 | Gyllenhammer et al. | |
| 8,856,203 B1* | 10/2014 | Schelp | G06F 12/02 370/389 |
| 9,111,615 B1* | 8/2015 | Jiang | G06F 17/30982 |
| 2003/0004688 A1 | 1/2003 | Gupta et al. | |
| 2004/0100950 A1 | 5/2004 | Basu et al. | |
| 2004/0174820 A1 | 9/2004 | Ricciulli | |
| 2004/0215593 A1 | 10/2004 | Sharangpani et al. | |
| 2005/0108573 A1* | 5/2005 | Bennett | H04L 63/0245 726/4 |
| 2005/0111460 A1 | 5/2005 | Sahita | |
| 2005/0125687 A1 | 6/2005 | Townsend et al. | |
| 2005/0132342 A1 | 6/2005 | Lunteren | |
| 2005/0216770 A1* | 9/2005 | Rowett | H04L 63/101 726/5 |
| 2005/0238022 A1 | 10/2005 | Panigrahy | |
| 2006/0015654 A1 | 1/2006 | Krantz et al. | |
| 2006/0020595 A1 | 1/2006 | Norton et al. | |
| 2006/0085389 A1 | 4/2006 | Flanagan et al. | |
| 2006/0095588 A1 | 5/2006 | Lunteren | |
| 2006/0294297 A1* | 12/2006 | Gupta | G11C 15/00 711/108 |
| 2007/0115966 A1* | 5/2007 | Tzeng | H04L 45/742 370/389 |
| 2007/0168600 A1* | 7/2007 | Anthony, Jr. | H04L 65/1063 711/108 |
| 2008/0046423 A1* | 2/2008 | Khan Alicherry | G06F 17/30985 |
| 2008/0050469 A1* | 2/2008 | Kwon | G06F 21/564 426/23 |
| 2008/0140662 A1* | 6/2008 | Pandya | G06F 17/30979 |
| 2008/0192523 A1* | 8/2008 | Mondaeev | G11C 15/00 365/49.17 |
| 2008/0201772 A1* | 8/2008 | Mondaeev | H04L 63/1408 726/13 |
| 2009/0094226 A1* | 4/2009 | Lim | G06F 17/30516 |
| 2009/0100055 A1* | 4/2009 | Wang | G06F 21/564 |
| 2009/0141528 A1* | 6/2009 | Arsovski | G11C 15/04 365/49.17 |
| 2011/0145181 A1* | 6/2011 | Pandya | G06F 17/30985 706/27 |
| 2018/0262466 A1* | 9/2018 | Atad | H04L 63/0209 |

OTHER PUBLICATIONS

"Perl 5 version 26.1 documentation," available for download at least prior to Dec. 5, 2017 from https://perldoc.perl.org/perlre.html, pp. 1-36, perl.org.

Christiansen, Tom et al., "Programming PERL, Fourth Edition," Feb. 2012, pp. 43-46, 202-206, 214-217, 221-229, 231, 232 and 247-251, O'Reilly Media, Inc., Sebastopol, CA.

Friedl, Jeffrey E. F., "Mastering Regular Expressions, Second Edition," Jul. 2002, pp. 9-14, 17-20, 32, 59-67, 112, 113 and 135-140, O'Reilly & Associates, Inc., Sebastopol, CA.

Lin et al., "Hardware-Software Codesign for High-Speed Signature-Based Virus Scanning," IEEE Computer Society, IEEE, Sep./Oct. 2009, pp. 56-65.

Or et al., "Memory-Based Hardware Architectures to Detect ClamAV Virus Signatures with Restricted Regular Expression Features," IEEE Transactions on Computers, IEEE USA, vol. 65, No. 4, Apr. 2016, pp. 1225-1238.

Pao et al., "A memory-based NFA regular expression match engine for signature-based intrusion detection," Computer Communications 36 (2013), Elsevier, Mar. 15, 2013, pp. 1255-1267.

United States Patent and Trademark Office, Non-Final Office Action in U.S. Appl. No. 15/832,727, dated Feb. 23, 2018, 29 pages.

Van Lunteren et al., "Hardware-Accelerated Regular Expression Matching at Multiple Tens of Gb/s," Proceedings IEEE Infocom, IEEE, 2012, pp. 1737-1745.

Van Lunteren, "High-performance Pattern-Matching for Intrusion Detection," Proceedings IEEE Infocom, IEEE, 2006, 13 pages.

Wall, Larry et al., "Programming PERL, Third Edition," Jul. 2000, pp. 158-161, 165-167, 176, 182, 183 and 187, O'Reilly Media, Inc., Sebastopol, CA.

Wang et al., "Hardware Accelerator to Detect Multi-Segment Virus Patterns," Computer Journal, Section D: Security in Computer Systems and Networks, vol. 58, No. 10, Aug. 22, 2014, pp. 2443-2460.

Yu et al., "Gigabit Rate Packet Pattern-Matching Using TCAM," IEEE, Proceeding of the 12th IEEE International Conference on Network Protocols (ICNP'04) in Berlin, Germany, Oct. 2004, 10 pages.

\* cited by examiner

Parse each rule into sequences of literal characters (ch) and variable-character expressions (vce)

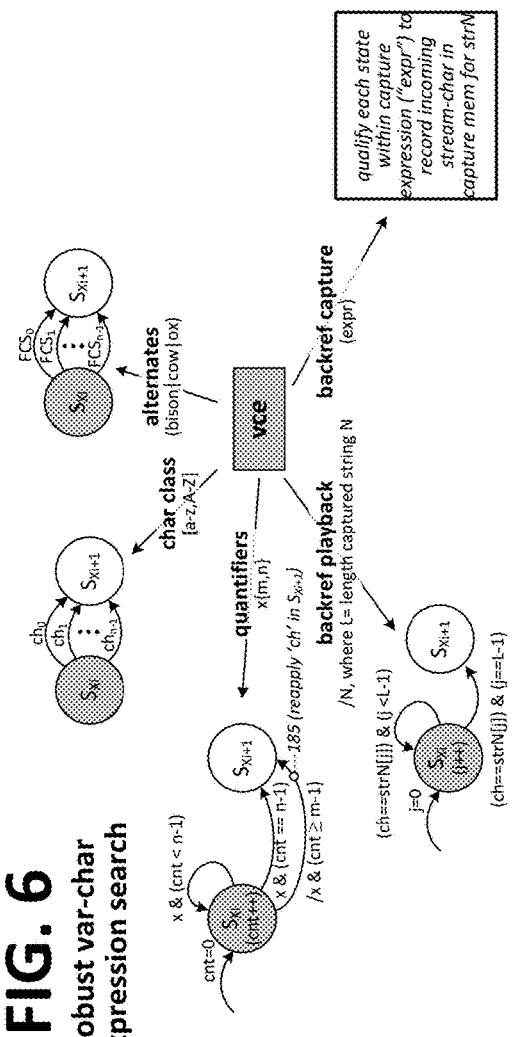
FIG. 5 accelerated fixed-pattern matching
FIG. 6 robust var-char expression search
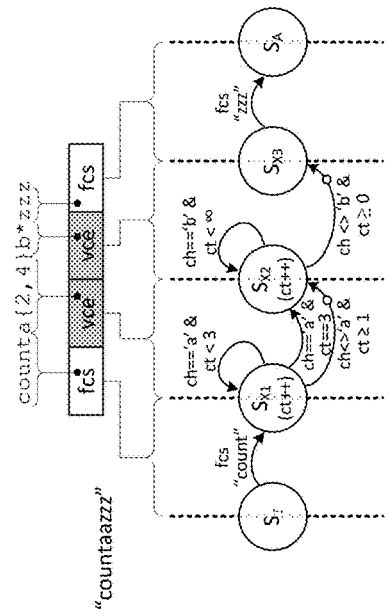
FIG. 7A Character Class
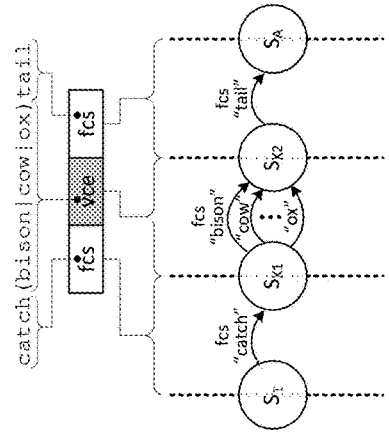
FIG. 7B Word Alternate
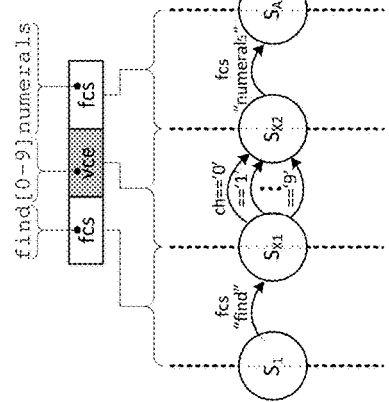
FIG. 7C Quantifier

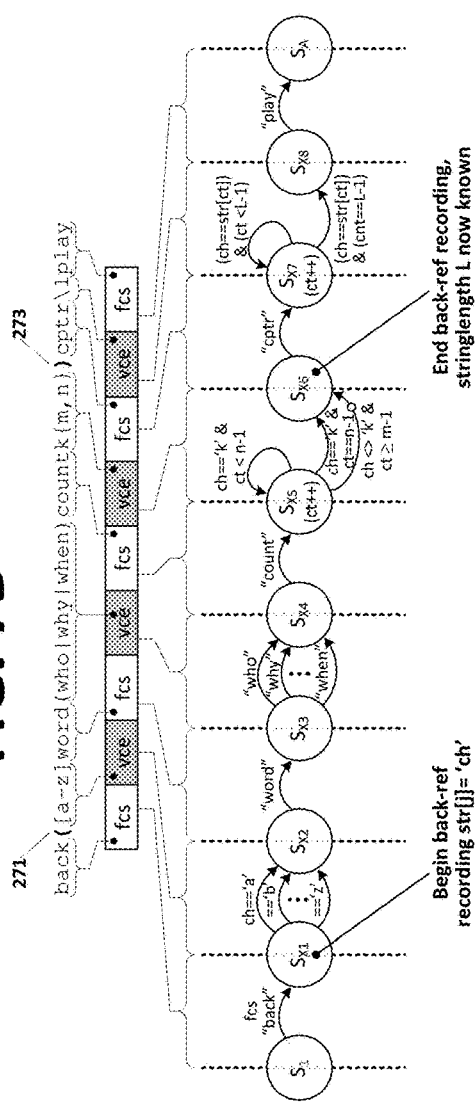
FIG. 7D Back-Reference
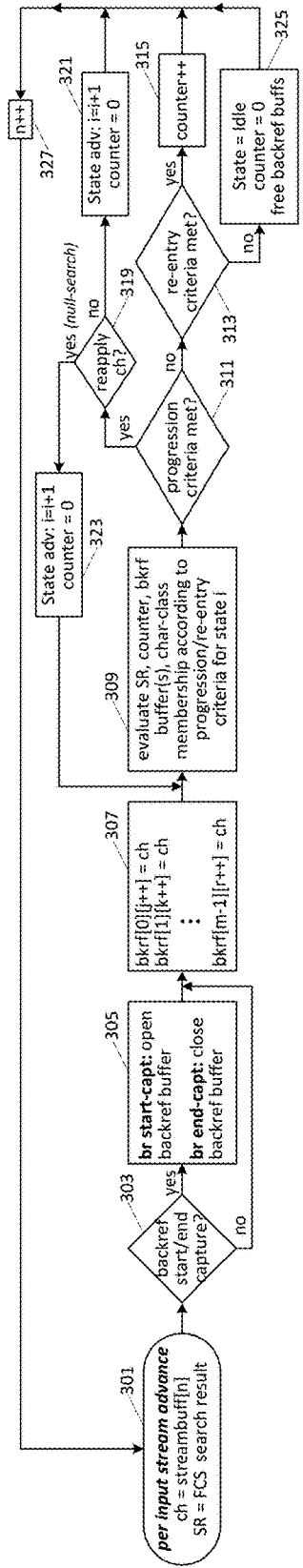
FIG. 8 Search-State 'i' Transition Logic

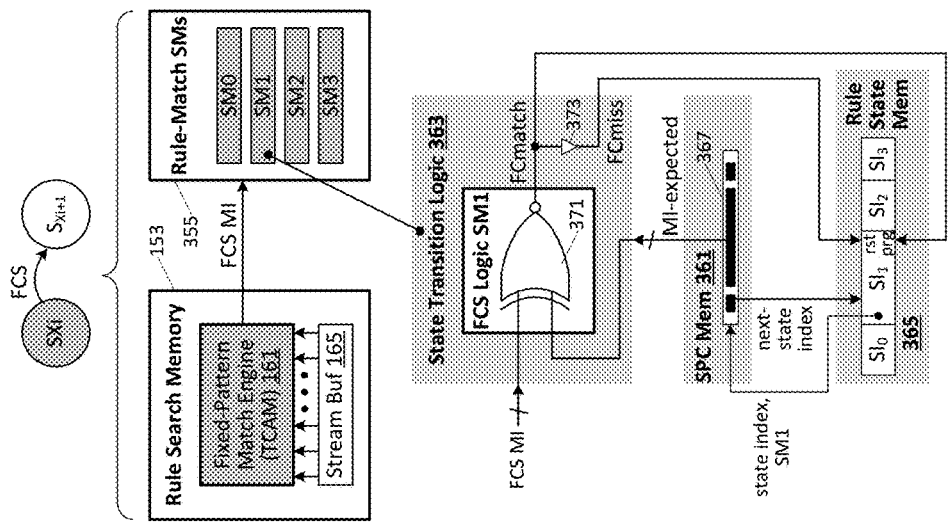
FIG. 10 Fixed-Char Sequence (FCS) search
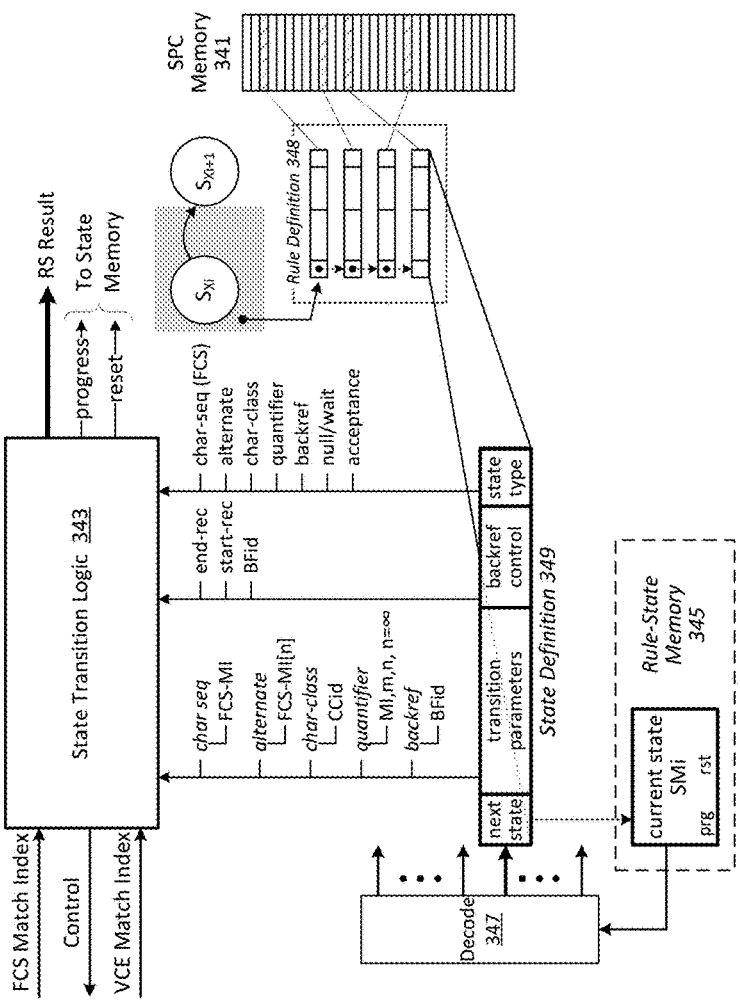
FIG. 9 Rule-Match State Machine CCM Look-Up

FIG. 14 Populating CCMT var-char expression search: character-class

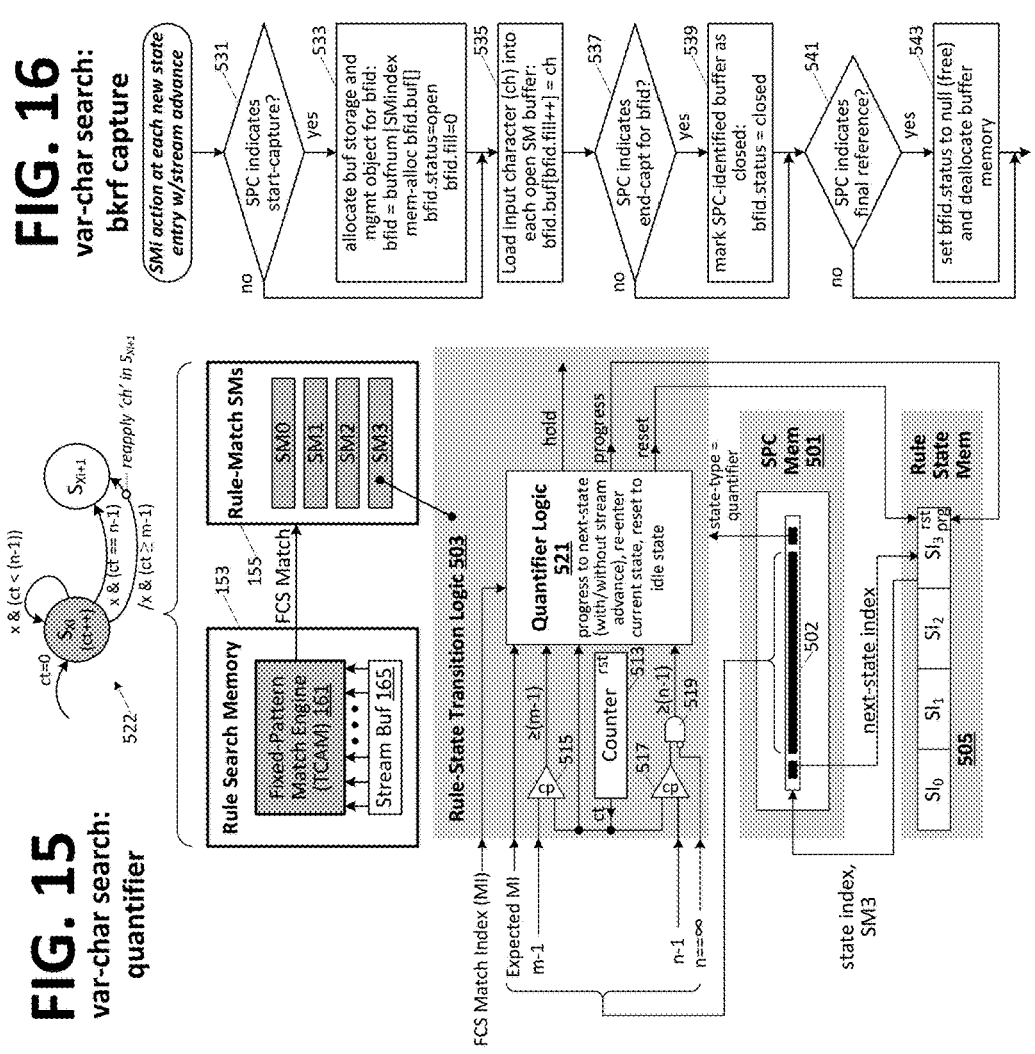
FIG. 17 var-char search: bkrf playback
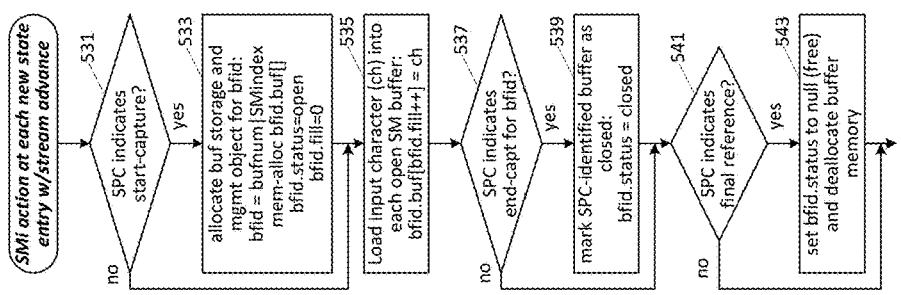
FIG. 16 var-char search: bkrf capture
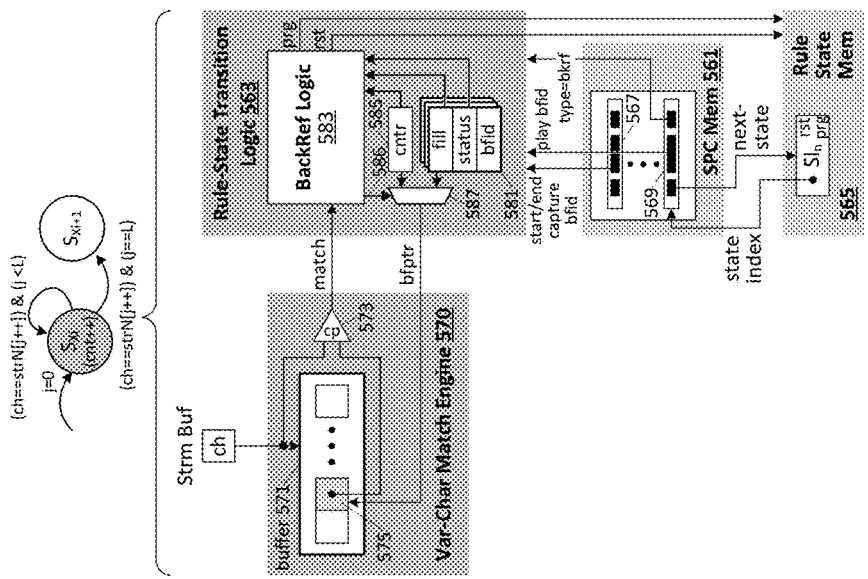
FIG. 15 var-char search: quantifier

REAL-TIME REGULAR EXPRESSION SEARCH ENGINE

TECHNICAL FIELD

The present disclosure relates to network security.

BACKGROUND

The proliferation and ever-increasing sophistication of malware in its various forms—viruses, worms, advanced persistent threat (APT), distributed-denial-of-service (DDoS) attack or any other code or traffic that represents an actual or potential security threat—has traditionally been countered by software-based detection schemes that favor tractability over execution speed. As network data rates escalate, however, the malware detection bottleneck is becoming increasingly problematic, constraining network performance particularly in high-throughput enterprise networks.

DRAWINGS

The various embodiments disclosed herein are illustrated by way of example, and not by way of limitation, in the figures of the accompanying drawings and in which like reference numerals refer to similar elements and in which:

FIG. 5 depicts an exemplary state-transition diagram with respect to a fixed-pattern character sequence; a portion of a larger state diagram in which a fixed-pattern match triggers a progression from current state $S_{Xi}$ to next-state $S_{Xi+1}$, and fixed-pattern mismatch triggers a reversion to the idle state, $S_I$;

FIG. 6 illustrates exemplary state-transition diagrams with respect to various variable character expressions, including quantifier, character-class, word-alternates, and back-reference expressions;

FIG. 7A depicts an exemplary three-segment rule and corresponding rule-match state diagram;

FIG. 7B illustrates another three-segment rule, in this example having a word-alternate variable-character expression sandwiched between fixed-pattern character sequences;

FIG. 7C illustrates an exemplary four-segment rule in which a pair of quantifier expressions are sandwiched between starting and ending fixed-pattern character sequences;

FIG. 7D illustrates an exemplary nine-segment rule in which each of four variable-character expressions, including one back-reference, are sandwiched between respective pairs fixed-pattern character sequences;

FIG. 8 illustrates an exemplary sequence of operations carried out by an active rule-tracking state machine with respect to each search cycle;

FIG. 9 illustrates exemplary interconnection and coordination between state progression code (SPC) memory, state transition logic and rule-state memory, components of a rule-tracking state machine implemented in accordance with the conceptual embodiment shown in FIG. 2;

FIG. 10 illustrates exemplary SPC memory, state transition logic and rule-state memory components provided to implement a state-machine-based fixed-pattern character search;

FIG. 14 illustrates an exemplary sequence of operations that may be executed to populate the character-class lookup table of FIG. 13;

FIG. 15 illustrates elements provided within an SPC memory, state transition logic and rule-state memory to implement a state-machine-based quantifier search;

FIG. 16 illustrates an exemplary sequence of back-reference capture operations executed by a rule-tracking state machine at each new state entry in which the input data stream is advanced;

FIG. 17 illustrates elements provided within an SPC memory, state transition logic, and rule-state memory to enable state-machine-controlled back-reference capture and playback operations;

DETAILED DESCRIPTION

In various embodiments disclosed herein, a malware search engine parses malware signatures into respective collections of rule segments in which each rule segment defines a respective "search" state within a finite state machine and may correspond to an arbitrary number of characters in an incoming search stream. In a number of implementations, for example, each malware signature or "rule" is resolved into an ordered sequence of segments in which each individual segment is either a variable character expression or a literal character string of arbitrary length—that is, a string length according to the number of literal characters that are to appear between two variable character expressions (or between a variable character expression and rule-end or rule-start). Each literal character string (also referred to herein as a fixed-pattern character sequence (FCS)) is stored within one or more rows of a content-addressable memory (CAM) to permit highly-parallel and therefore extremely rapid string-match determination—an architecture that enables robust, cost-effective malware detection at the nominal data rate of the input media (e.g., at "line rate" and thus in real-time), avoiding the detection bottlenecks that plague conventional software-based approaches.

Figure 1:
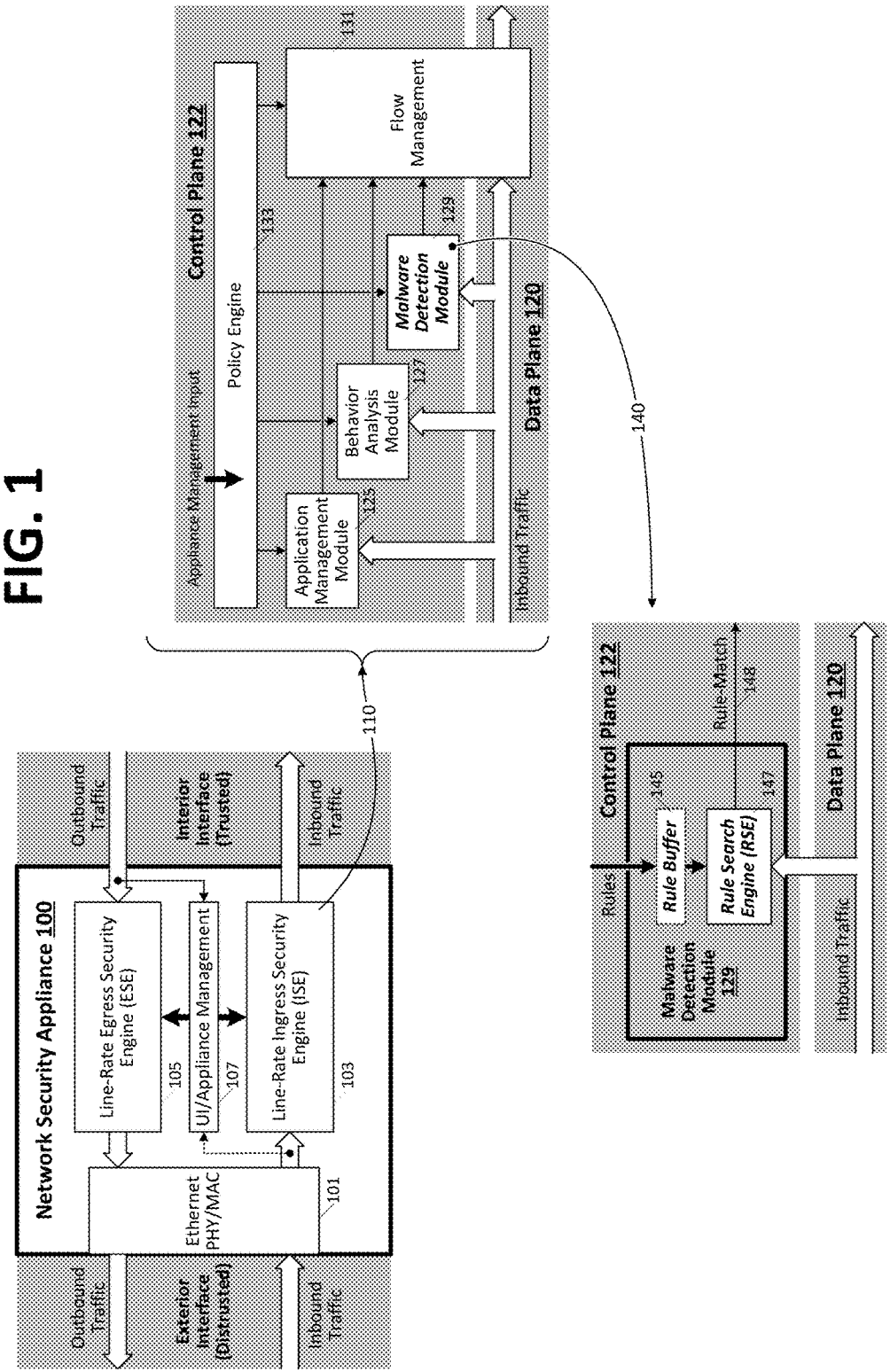
FIG. 1 illustrates an embodiment of a network security device that executes line-rate malware detection with respect to packetized network traffic.

FIG. 1 illustrates an embodiment of a network security appliance or device 100 that executes line-rate malware detection with respect to packetized network traffic flowing between an interface to a distrusted exterior network ("exterior interface"—e.g., Internet interface) and an interface to a nominally trusted interior network ("interior interface"). While appliance 100 (which may constitute or be part of a firewall and/or carry out various other network functions such as traffic switching/routing, access control, deduplication, accounting, etc.) is depicted as having an Ethernet-based exterior interface (implementing at least physical (PHY) and media-access control (MAC) layers of the Ethernet stack as shown at 101) and a more generalized interior interface, various alternative or more specific network interfaces may be used on either or both sides of the appliance, including proprietary interfaces where necessary. Also, while separate (split) inbound and outbound traffic paths are shown, a single bidirectional path may be implemented with respect to either or both of the exterior and interior interfaces.

At its core, network security appliance 100 implements a pair of line-rate security engines 103 and 105, each coupled to a user-interface/appliance-management module 107. In the split-traffic embodiment shown, line-rate security engine 105 executes security and control operations with respect to traffic egres sing from the interior network to the exterior network (i.e., outbound traffic) and is thus referred to as an "egress security engine" (ESE), while line-rate security engine 103 executes security and control operations with respect to traffic ingressing from the exterior network to the interior network (i.e., inbound traffic) and is referred to accordingly herein as an "ingress security engine" (ISE). While the ingress and egress security engines generally implement asymmetric security and control functions (due, for example, to disparate trust in the respective networks from which they receive traffic), both security engines may carry out the same or similar operations with respect to traffic flows and/or contain same or similar architectural components. Accordingly, while various security and control structures and operations discussed with respect to embodiments below focus on traffic inbound from the distrusted exterior network and thus security architectures within ingress security engine 103, in all cases such structures and operations may be implemented within egress security engine 105 to provide security/control with respect to outbound traffic. Also, though shown and described as separate security engines, the ingress and egress security engines may be merged into a single security engine that executes security/control actions with respect to inbound and/or outbound traffic, particularly in implementations that manage traffic over a bidirectional path between either or both of the exterior and interior interfaces.

FIG. 1 also depicts an exemplary detail-view (110) of ingress security engine 103 and its general organization into a data plane 120 through which packetized network traffic flows (preferably but not necessarily at line rate) and a control plane 122 that carries out control and management operations with respect to the network traffic. As shown, control plane 122 includes a policy engine 133, application management module 125, behavior analysis module 127 and malware detection module 129, the latter being the particular focus of various embodiments discussed below. Control plane 122 and data plane 120 jointly contribute to traffic flow management within a flow management unit 131 and, though not specifically shown, data plane 120 may additionally include one or more buffers to queue or otherwise store traffic supplied to control plane modules 125, 127 and 129 and/or flow management unit 131. Control plane 122 may also include various other components to manage flow detection and tracking (e.g., organizing incoming packets with respect to logical flows and/or notifying other control-plane components of flow-switch events) and bandwidth allocation.

In general, policy engine 133 enables application-tailored operation within ingress security engine 103, applying input from user-interface/appliance-management unit 107 (e.g., user input received via a dedicated user interface and/or included within traffic from the trusted network or, with appropriate safeguards, from the exterior network) to control operation within control plane modules 125, 127, 129 and flow management unit 131. In the case of malware detection module 129, for example, policy engine 133 may supply (with or without processing) malware signatures or "rules"—continuous or disjointed strings of symbols that correspond to known malware implementations—that are to be detected within inbound traffic and reported to flow management unit 131. As discussed below, flow management unit 131 may take various actions with respect to reported malware detections, including blocking malware-infested traffic flows and/or seizing information with respect to such flows to enable forensic or other advanced security measures.

FIG. 1 also shows a more detailed embodiment (140) of malware detection module 129 that includes a rule buffer 145 and a hardware-accelerated rule search engine 147. As shown, rule buffer 145 receives rules from a source within control plane 122 (e.g., policy engine 133 of FIG. 1) and forwards or otherwise makes those rules available to rule search engine 147. Rule search engine 147 additionally receives inbound traffic from the data plane 120 and asserts a rule-match signal 148 to notify downstream functional blocks (e.g., flow management 131 unit) of a malware detection event upon confirming a match between a rule (malware signature) and contents of the inbound traffic.

Still referring to FIG. 1, while inbound traffic is delivered to malware detection module 129 at line-rate (i.e., according to network bandwidth) and in real-time (i.e., as the traffic arrives), rule delivery and other control plane operations (e.g., configuration operations, etc.) may occur at slower rates and/or during times of relatively low traffic or even zero traffic (e.g., where run-time operation of the host network security appliance is suspended for maintenance or other down-time). Moreover, rules may be delivered alternatively as a full set of replacement rules (e.g., delivering a completely new database or library of rules) and/or as occasional updates to a previously delivered or accumulated rule database. Accordingly, depending on the rule delivery rate and/or rule format (update vs. complete database), temporary storage of rules prior to delivery and implementation within rule search engine 155 may be unnecessary, making buffer 145 an optional feature as indicated by its depiction in dashed outline (a drawing convention used generally herein, though features shown without dashed line or dashed outline may also be optional unless explicitly stated otherwise).

Figure 2:
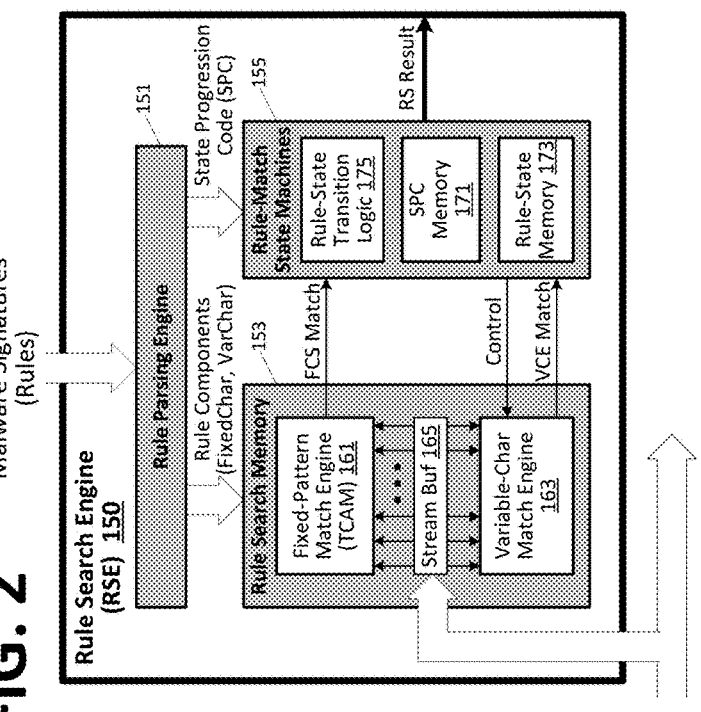
FIG. 2 illustrates an embodiment of a rule search engine that may be used to implement a more generalized rule search engine shown in FIG. 1.

FIG. 2 illustrates an embodiment of a rule search engine 150 (RSE) that may be used to implement RSE 147 of FIG. 1. As shown, rule search engine 150 includes a rule parsing engine 151, rule search memory 153 and one or more rule-match state machines 155. Rule parsing engine 151 receives malware signatures (i.e., rules), for example in the form of a bulk rule set or one or more incremental rule updates, and resolves each rule into an ordered sequence of rule segments and an accompanying state progression code sequence. The rule segments include one or more fixed-pattern character sequences, "FCS," (each FCS constituting a respective rule segment) and variable-character expressions, "VCE," that are used to populate a fixed-pattern match engine and a variable-character match engine, respectively, while the state progression code sequence is loaded into a storage element within the rule-match state machines. During operation, the input data stream is propagated through a stream buffer 165 within the rule search memory 153 and supplied from that buffer to both the fixed-pattern match engine 161 (e.g., a ternary CAM (TCAM)) and variable character match engine 163, thereby enabling the input data stream (or a portion thereof) to be searched in parallel (concurrently) for both fixed-pattern character sequences and variable character expressions.

Figure 3:
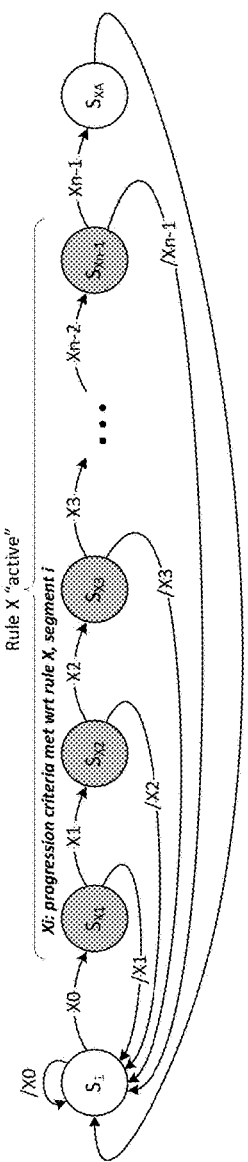
FIG. 3 illustrates an exemplary rule-state diagram corresponding to state-to-state transitions within a dynamically allocated rule-match state machine within the rule search engine of FIG. 2.

Still referring to FIG. 2, fixed-pattern match engine 161 and variable-character match engine 163 output FCS match indices and VCE match indices, respectively, to rule state machine(s) 155, with each match index identifying a rule-segment match with respect to one or more characters within the stream buffer. In a number of embodiments, multiple rule-match state machines are implemented within RSE 150 and dynamically allocated to track state progressions with respect to individual rules based on the incoming sequence of FCS and VC match indices. In general, each allocated state machine outputs respective sets of one or more control signals to the rule search memory and/or asserts a rule-match signal according to the state of the rule being tracked by that state machine. Referring to the exemplary rule-state diagram of FIG. 3, for instance, as the input data stream propagates through the stream buffer, matches between characters/character-strings in that data stream and respective segments of a rule are reflected by progression of a state machine (dynamically allocated to track that rule) from an initial idle state ($S_I$) through a sequence of intermediate states ($S_{X1}$, $S_{X2}$, $S_{X3}$, $S_{Xn-1}$) and eventually to an "acceptance" state ($S_A$) in which the complete malware signature is deemed detected within the input data stream. After the first matching segment of a rule has been identified and before reaching the acceptance state, the rule and state machine allocated to track the rule are said to be "active" within the rule search engine, and a mismatch with respect to any character/character-string required for the state machine to progress to a subsequent state or re-enter the current state (i.e., "progression failure") will cause the state machine to revert to an inactive (idle, deallocated) state and render the subject rule inactive (at least as to that particular rule-tracking instance).

In the particular embodiment depicted in FIG. 2, a managed pool of allocable state machines (i.e., two or more) is assumed, with idle and active state machines referred to herein as resident in or allocated from the pool, respectively, and with active state machines being returned to the pool upon reaching an acceptance state or state progression/re-entry failure. Within the rule-state machine implementation (155), a state progression code (SPC) memory 171 is provided to store rule-state definitions corresponding to respective segments of various rules, a rule-state memory 173 is provided to track/record the state of allocated and allocable state machines over time, and rule-state transition logic 175 is provided to resolve state-to-state transitions. Tractable, rule-driven state machine operation via these components is discussed in greater detail below.

Figure 4:
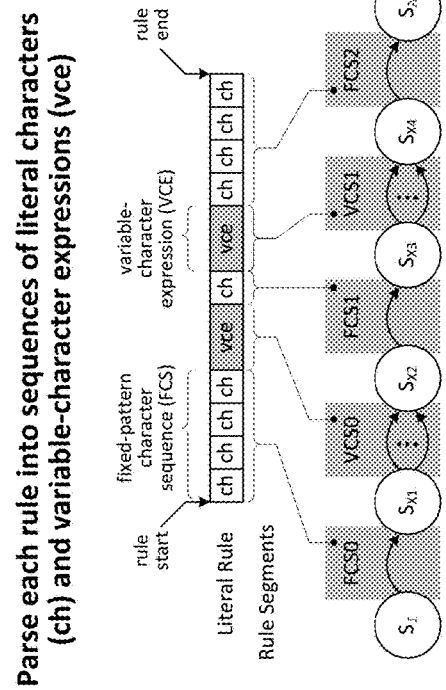
FIG. 4 illustrates an exemplary rule parsing operation in which a rule is segmented into distinct fixed-pattern character sequences and variable-character expressions, with each rule segment corresponding to a respective state-to-state transition within a rule-match state machine.

FIG. 4 illustrates an exemplary rule parsing operation in which a rule is segmented into distinct fixed-pattern character sequences (FCS) and variable-character expressions (VCE), with each rule segment corresponding to a respective state-to-state transition within a rule-match state machine. As shown, each FCS rule segment is constituted by a deterministic sequence of literal characters bounded by variable character expressions or by a single variable-character expression and either the start or end of the rule. Each of the variable-character expressions is marked by one or more metacharacters—regular-expression symbols that signify either (i) non-deterministic sequences of one or more literal characters, or (ii) administrative actions to be executed in connection with input-data referencing variable character expressions. Examples of supported variable-character expressions include, for example and without limitation:

character-class expressions in which an incoming character (e.g., at a predetermined location within the stream buffer) is deemed to satisfy the rule-state progression criteria—and thus enable a rule-tracking state machine to progress to a subsequent state—if that character is one of a prescribed number of alternative literal characters;

word-alternate expressions in which an incoming character sequence is deemed to satisfy the rule-state progression criterion if the character sequence matches one of multiple predefined character strings (also referred to herein as "words");

quantified expressions ("quantifiers") in which a variable number of instances of a literal character or string of literal characters is permitted within the input data stream;

back references in which a pre-recorded sequence of literal characters, drawn from the input data stream itself, is to be confirmed at a later point in the data stream; and back-reference administration expressions, including metacharacters that mark the beginning and ending points of a back reference, typically bounding one or more other types of variable character expression (e.g., quantifier, character class, word-alternate).

In a number of embodiments, fixed-pattern character sequences and word-alternate variable-character expressions are resolved into TCAM entries to enable match/mismatch determination in a single search cycle. That is, as shown in FIG. 5, constituent characters of an FCS expression are searched in parallel to speed the overall search operation (e.g., in comparison to software-controlled approaches that sequence through one character compare at a time) and enable single-search-cycle determination of the subsequent rule-state. More specifically, the search result generated by a single parallel compare of the stream buffer content (and thus a portion of the input data stream) and TCAM content may be used to resolve the next-state transition for a given state machine, either progressing to the next-state (FCS match) or reverting to the idle state (FCS mismatch). As discussed below, FCS expressions (including alternate fixed-character strings within word-alternate expressions) may be stored at strategic column offsets within the TCAM to permit wait-less progression to subsequent segment search, despite multi-character FCS match or word-alternate match.

FIG. 5 also depicts an exemplary state-transition diagram with respect to a fixed-pattern character sequence; a portion of a larger state diagram in which a fixed-pattern match triggers a progression from current state $S_{Xi}$ to next-state $S_{Xi+1}$, and fixed-pattern mismatch triggers a reversion to the idle state, $S_I$. FIG. 6 illustrates exemplary state-transition diagrams with respect to various variable character expressions, including quantifier, character-class, word-alternates, and back-reference expressions. In general, character-class and back-reference segment matches are confirmed by a single-character search (or sequence of single-character searches) in which a single character is evaluated for character-class membership (character-class) or buffer-content match (back-reference), with the tracking state machine either progressing to the next state (match) or reverting to the idle state following the character evaluation. Word-alternate expressions generally include at least one string search (i.e., parallel comparison of multiple input characters with a TCAM-resident fixed-pattern character sequence), and quantifiers may involve either a single-character search, a string search or a special pass-through "null" search, depending on the quantifier operand. Back-reference capture and look-ahead expressions do not themselves trigger searches and instead direct input stream buffering (start recording input stream into buffer or stop an ongoing recording) and provide progression criteria to be applied in other search states.

Still referring to FIG. 6 and more specifically to the character-class search, an input character at a predetermined position within the input data stream is evaluated to determine whether it is a member of a rule-specified set of characters (i.e., a character class). Common character-class examples include alphanumerics (e.g., lower-case and/or upper-case alphabetic characters, numeric digits, etc.) and sets of symbolic characters, but any collection of two or more literal characters may define a character class in the more general case. In the character-class search operation, the rule-tracking state machine determines whether the input character next in line to be searched (the "search" character) is or is not a member of the character class, progressing to subsequent state SXi+1 following an affirmative determination and reverting to the idle state (rule mismatch) otherwise. A word-alternate search is analogous to a character-class search, but with an input character string being compared with set of multi-character strings ("word class") instead of a single character match evaluation with respect to individual literal characters. In the specific example shown, a match between a character string within the stream buffer (lead by the search character) and any of the strings "bison," "cow," or "ox" constitutes an affirmative segment-search result and will trigger progression to the next state, while mismatch (no match with respect to any of the strings within the word-alternate expression) will render the state machine to the idle state.

In a quantifier search, a quantifier operand, depicted by placeholder 'x', is required to appear in the input data stream at least a minimum number (m) of times and not more than a maximum number (n) of times, where m and n constitute quantification parameters (or operators) and may express an integer range from zero to infinity, or any finite interval within that range. While a generalized quantifier in a given rule may be expressed as x{m, n}, special-case operators '*', '+', '?', '{m,} and {n} may be used to express conditions x{0,∞}, x{1,∞}, x{0,1}, x{m, ∞} and {n, n} (exactly 'n' instances), respectively. Further, the m=0 condition represents a special case in which the operand need not appear in the input data stream at all, meaning that a negative search result with respect to the operand (input char < > x) constitutes a special "null-search" state progression in which the evaluated input character or character string is to be re-evaluated in the subsequent rule-tracking state and thus an exception to the general rule of input stream advance by one or more characters following each rule-state progression. More generally, this same null-search progression may occur with respect to any quantifier that expresses an indeterminate instance count (i.e., all except for {n, n}), as an operand mismatch ("/x") in combination with an instant count (ct) greater than or equal to the minimum instance count ("m−1" in a start-from-zero instance count) will trigger a progression event. Such null-search progression path is shown in FIG. 6 by the expression "/x & (ct≥m−1)" and denoted by bubble 185 as a special case in which the input character or character string under evaluation is to be reevaluated in the subsequent rule-state.

Continuing with the quantifier example, an operand match in combination with a count less than the maximum (i.e., "x & (ct≤n−1)") will trigger a re-entry into (or retention of) the same rule-state. Finally, an operand match in combination with a count equal to the maximum ("x & (ct==n−1)") will trigger progression to the next state without the special null-search input character reevaluation.

A back-reference is a comparison of a selected portion of the input stream with later received input stream content, an operation that involves both a data capture operation (recording the selected portion of the input stream in a buffer) and one or more playback operations (comparison of the buffered data with later-received input data). Back-reference data capture is generally directed by non-searched metacharacters within a rule (e.g., capture-start and capture-end denoted by open and closed parenthesis symbols '(' and ')', respectively), while back-reference playback is marked by a metacharacter reference to a previously captured string—typically an enumerated reference such as "/1", "/2" etc. in which each incremental reference enumeration refers to a subsequently captured string.

In the exemplary state-transition diagram of FIG. 6, back-reference playback involves re-entry into the same back reference playback state so long as the input data character matches the captured string content and the end of the captured string has not been reached (i.e., "(ch==strN[j]) & (j<L−1)", where strN is the captured string, j is the index into the captured string and 'L' is the length of the captured string ("L−1" being the final indexed character starting from 0). The back-reference expression is deemed completely matched upon detection of a character match at the final buffer index (i.e., "ch=strN[j] & j==L−1)"), and triggers progression to the next state.

FIG. 7A depicts an exemplary three-segment rule and corresponding rule-match state diagram. In the specific example shown, a variable character expression—specifically a character-class formed by the digits 0-9—is sandwiched between two fixed-pattern character sequences. In this case, each rule segment defines a transition from one state to another in the rule-tracking state diagram, so that three rule-state transitions are required to progress from an initial idle state to a final acceptance state. More specifically, upon detecting an FCS match between the input data stream and the string "find," a rule-state machine is allocated to search for the remaining rule segments, an operation effected by transitioning an available state machine (e.g., selected from a "standby" pool of unallocated state machines) from the idle state to search state $S_{X1}$, where 'X' represents the rule being tracked and '1' is the first active state in the rule-X state diagram. State $S_{X1}$ is a character-class search state and thus a state corresponding to the variable character expression rule segment "[0-9]" and in which next-state progression or reversion to idle is dependent on whether the next-in-line input character is or is not a member of the specified character class. Thus, if head-of-line input character "ch" is any numeric digit ('0', '1', . . . , '8', '9'), the progression criterion is satisfied and the state machine progresses to search state $S_{X2}$. If "ch" is not a numeric digit and thus not a member of the subject character class, the rule-tracking state machine reverts to the idle state, a transition that effects a deallocation and return to the standby pool. State $S_{X2}$ corresponds to the final FCS segment of the rule, so that the state machine either progresses from $S_{X2}$ to acceptance state $S_A$ or reverts to idle state $S_I$ according to whether the next three characters of the input data stream match or do not match the string "numerals." If the final FCS segment is matched (state $S_{X2}$ progression criterion met), the rule-tracking state machine transitions to the acceptance state and signals an affirmative rule-match result to enable flow-control operations within downstream circuitry. After reaching the acceptance state, the rule-tracking state machine is returned to the pool of allocable state machines (i.e., transitions to the idle state).

FIG. 7B illustrates another three-segment rule, in this example having a word-alternate VCE sandwiched between FCS expressions. As before, detection of the initial FCS expression ("catch" in this example) will trigger allocation of a rule-tracking state machine and render the state machine into active state $S_{X1}$. State $S_{X1}$ corresponds to the word-alternate VCE rule segment and thus will either progress to next state $S_{X2}$ or revert to idle state $S_I$ according to whether the next-in-line input character sequence matches one of the word-alternate expressions ("bison," "cow," or "ox" in this example). If the input data stream contains a matching word of the three alternatives (more or fewer alternative words may appear in other word-alternate VCEs), the progression criterion is satisfied and the state machine progresses to state $S_{X2}$. Otherwise, if the input data stream lacks a word match with respect to all alternatives, the state machine reverts to the idle state and thus to the standby pool. State $S_{X2}$ corresponds to the final FCS segment of the rule, so that the state machine either progresses from $S_{X2}$ to acceptance state $S_A$ or reverts to idle according to whether the next four characters of the input data stream match or do not match the string "tail." If the final FCS segment is matched (state $S_{X2}$ progression criterion met), the state machine transitions to the acceptance state and signals the affirmative rule-match result to enable flow-control operations within downstream circuitry.

FIG. 7C illustrates an exemplary four-segment rule in which a pair of quantifier VCEs are sandwiched between starting and ending FCS expressions. As before, detection of the initial FCS expression ("count" in this example) will trigger allocation of a rule-tracking state machine and render the state machine into active state $S_{X1}$. State $S_{X1}$ corresponds to the first of two quantifier expressions (the first of two VCEs), "a{2,4} so that at least m=2 successive instances and not more than n=4 successive instances of character "a" (the operand) are required to progress to subsequent search state $S_{X2}$. As in the generalized quantifier state diagram discussed above, there are generally three conditions/criteria under which active rule tracking is maintained upon entry into a quantifier search state—two state-progression conditions one state-reentry condition. Starting with the re-entry condition, as long as the input data continues to match the quantified operand (a single-character operand in this example) and the count of operand-match instances ("ct") remains below the maximum (i.e., ct<4 in this example, or, in the start-from-zero counting case, ct<n−1 and thus ct<3), the state machine will remain in or re-enter state $S_{X1}$—a re-entry path designated by the expression "ch=='a' & ct<3." By contrast, upon detecting an operand match in combination with a maximum count value ("ch=='a' & ct==3"), one of the two progression criteria is satisfied and the state machine progresses to state $S_{X2}$. The other of the two progression criteria is the null-search case in which the next-in-line input character is determined not to match operand 'a', but the count is greater than or equal to the minimum count (i.e., ct≥1 in this example, assuming a start-from-zero count) so that the minimum number (but not the maximum number) of operand instances have been found. In this null-search progression path (denoted in FIG. 7C by the null-search bubble), the input character evaluated to confirm operand mismatch is carried forward to be re-evaluated in subsequent state $S_{X2}$—an operation that may be viewed alternatively as evaluating the subject input character in both $S_{X1}$ and $S_{X2}$ in the same search cycle or a null occupation (i.e., skip-over) of state $S_{X1}$ in the subject search cycle.

Still referring to FIG. 7C, state $S_{X2}$ corresponds to the second of the two quantifier expressions, "b*" (alternatively expressed b{0,∞}) so that 0 to ∞ instances of operand "b" will trigger a state progression to subsequent search state $S_{X3}$. The unlimited maximum count effectively eliminates the "exact count" progression criteria, so that the rule-tracking state machine will either (i) iteratively re-enter quantifier state $S_{X2}$ an unlimited number of times so long as the input character matches the operand or, (ii) upon operand mismatch, progress to state $S_{X3}$ along null-search progression path ("ch < > 'b' & ct≥0," with the latter inequality always true) such that the input character that yielded the operand mismatch is reevaluated in state $S_{X3}$. State $S_{X3}$ corresponds to the final FCS segment of the rule, so that the state machine either progresses from $S_{X3}$ to acceptance state $S_A$ or reverts to idle according to whether the next three characters of the input data stream match or do not match the string "zzz." If the final FCS segment is matched (state $S_{X3}$ progression criterion met), the state machine transitions to the acceptance state and signals the affirmative rule-match result to enable flow-control operations within downstream circuitry.

FIG. 7D illustrates an exemplary nine-segment rule in which each of four variable-character expressions, including one back-reference, are sandwiched between respective pairs of fixed-pattern character sequences. As before, detection of the initial FCS expression ("back" in this example) will trigger allocation of a rule-tracking state machine and render the state machine into active state $S_{X1}$. The open parenthesis symbol '(' 271 following the initial FCS expression constitutes a back-reference begin-capture directive and thus an instruction to buffer (store) subsequently received input characters until either (i) all rule segments that precede a counterpart end-capture directive ')' is reached or (ii) rule mismatch is confirmed, in which case the buffer storage allocated in response to the begin-capture directive is released for use in subsequent buffering operations. In one embodiment, back-reference buffering is initiated by dynamically allocating a buffer "str" of a predetermined size in response to the begin-capture directive and zeroing (initializing) a buffer index dedicated to the newly allocated buffer. Thereafter, the input character or character string evaluated in each search state prior to the end-capture directive is loaded into the buffer (with concomitant increment to the buffer index). In one embodiment, for example, a rule search engine implemented generally as shown in FIG. 2 includes a storage pool (e.g., within variable-character match engine 163) from which buffer storage may be allocated, with buffer-specific status, identifier and index registers maintained within rule-match state machines 155 (e.g., within rule-state transition logic 175). In general, the buffer status register (i.e., content thereof) indicates whether the corresponding buffer is "open" or "closed," with the former indicating an allocated buffer actively being loaded with stream data (a status entered following capture-start directive and prior to encountering a corresponding end-capture directive) and the latter indicating an allocated buffer that is no longer being loaded (i.e., a status following capture-end directive). The index register indicates the present load position within an open buffer and the stored string length within a closed buffer, and the buffer identifier is used to signify buffer allocation and to associate allocated buffers with individual rules and their rule-tracking state machines. Multiple buffers, open or closed, may be associated with a single rule-tracking state machine and multiple active state machines may each be concurrently associated with an arbitrary number of buffers. Provisions may be made for dynamically extending the length of a given buffer in the event that the stored string exceeds an initially allocated buffer size. In any case, at each search state, a rule-tracking state machine loads the input character or character string under evaluation into each open buffer allocated on behalf of that state machine, eventually closing those buffers as their respective end-capture directives are encountered and then releasing each closed buffer (e.g., by clearing the buffer ID register) following the final back-reference playback operation directed by the rule. In the event of rule-mismatch confirmation (i.e., failure to progress or re-enter a given search state), all buffers allocated to the subject state machine, open or closed, are released back to the storage pool.

Still referring to FIG. 7D, a character-class expression (VCE) follows the start-capture directive, then a fixed-pattern character sequence ("word"), then a word-alternate expression (another VCE), another fixed-pattern character sequence ("count") and finally a quantifier (operand='k', min/max parameters='m'/'n') before end-capture directive 273 is reached. Assuming that each of the rule-segment expressions between start-capture and end-capture directives 271 and 273 are satisfied (i.e., state by state progression continues at least to the FCS rule segment "cptr" that succeeds the end-capture directive), the following apply:

- the allocated back-reference buffer will contain the input character sequence that yielded the rule-state progression between those directives,
- the buffer-status register will signify a closed buffer (an action carried out by the rule-tracking state machine in the transition from the search-state for the quantifier VCE that precedes the end-capture directive to the search-state for the FCS segment that follows the end-capture directive), and
- the index register contains the buffer length.

Accordingly, if the rule-tracking state machine progresses past FCS search state $S_{X6}$ (i.e., search for "cptr") to back-reference search state $S_{X7}$, the ensuing input stream data will be compared character for character with the contents of the back-reference buffer to confirm a back-reference match or mismatch.

More specifically, for each matching input character prior to buffer end, back-reference search state $S_{X7}$ is re-entered, and upon detecting a match with the final buffered character, the rule-tracking state machine progresses to search state $S_{X8}$ to search for the final FCS segment ("play") of the subject rule. If the final FCS rule segment is matched, the rule-tracking state machine transitions to acceptance state $S_A$ and signals the affirmative rule-search result.

FIG. 8 illustrates an exemplary sequence of operations carried out by an active rule-tracking state machine with respect to each search cycle—an interval defined, in at least one embodiment, by the time required to carry out a search in the TCAM component of the fixed-pattern match engine and generally established by a system clock signal. In the particular embodiment shown and others discussed below, input data (i.e., in the data plane) is shifted through the stream buffer one character per search cycle so that a new character ("ch") enters the stream buffer in each search cycle. Where multiple-character matches are detected (e.g., FCS and word-alternate VCE), "wait" states may be implemented within allocated state machines while input data is shifted forward to a head-of-queue position within the stream buffer.

Still referring to FIG. 8, the stream advance and TCAM search operation carried out in each search cycle yields a new head-of-queue character "ch" (the "search character") and search result "SR" as shown at 301. If the rule segment corresponding to current state 'i' is accompanied by a back-reference start-capture and/or end-capture directive (affirmative determination at 303), then corresponding back-reference buffers are opened and/or closed as shown at 305. At 307, the search character is loaded into each open back-reference buffer allocated to the rule-tracking state machine. At 309, the state machine evaluates the FCS search result (SR) as well as a re-entry counter, back-reference compare result and/or character-class membership determination according to the progression and/or re-entry criteria for current state 'i'. If neither the progression criteria nor the re-entry criteria are met (negative determinations at 311 and 313, respectively), the state machine is idled and returned to the allocable pool, concluding the state transition operation for the current search cycle. More specifically, as shown at 325, the state index is reset to an idle state index ($S_I$), the re-entry counter is cleared (e.g., zeroed) and all allocated back-reference buffers are released back to the buffer pool.

Continuing with FIG. 8, if the state re-entry (or retention) criteria are met, but not the progression criteria (negative determination at 311, affirmative determination at 313), then the re-entry counter is incremented at 315 in preparation for the subsequent search cycle (stream advance and search result generation). If the progression criteria are satisfied despite a search-character mismatch—that is, the special null-search progression from a quantifier VCE—then affirmative determinations at 311 and 319 will trigger re-application of the search character with respect to the progression/re-entry criteria for the subsequent state. That is, a transition to the subsequent state is effected by incrementing the state index and clearing (zeroing) the re-entry counter as shown at 323. Thereafter, the FCS search result, re-entry counter, back-reference buffer, character-class membership are re-evaluated with respect to the progression/re-entry criteria for the new state, with the results of that evaluation following one of the alternative state-transition paths at 311 and 313. Note that the null-search may be handled by executing searches for two different states in parallel—effectively the approach implemented by execution of two search states in the same search cycle. Referring briefly to FIG. 7, for example, once a threshold number (m) of 'k's have been found, searches for additional instances of 'k' (up to the maximum, n) may be executed in parallel with searches for "cptr" (the subject of search-state $S_{X6}$). Thus, the null-search state terminology and depiction should be understood to be notational only, with various different search-state diagrams being applicable.

Still referring to FIG. 8, if, for any state 'i', the progression criterion/criteria are satisfied (affirmative determination at 311) in connection with a search-character match (negative determination at 319 as the search-character match excludes the null-search case), then the state index is advanced and re-entry counter cleared at 321 to effect a progression to the subsequent state 'i+1'. In all but the null-search progression paths (affirmative determinations at 311 and 319), the input data stream is advanced within the stream buffer in preparation for a subsequent search cycle, an operation indicated by the stream-buffer index increment (n++) at 327.

FIG. 9 illustrates exemplary interconnection and coordination between state progression code memory (341), state transition logic (343) and rule-state memory (345), components of a rule-match state machine implemented in accordance with the conceptual embodiment shown in FIG. 2. In general, state progression code (SPC) memory 341 stores, for each rule within the rule search memory, a sequence of rule-state definitions that correspond to respective states within a rule-match state diagram and that collectively constitute a rule definition 348. While various data structures may be used to record and organize this information, in the depicted embodiment, individual rule-state definitions for a given rule are stored at arbitrary memory locations as a linked list—a structure that permits rules to be modified, supplemented, deleted, etc. without disrupting storage of other rules. Accordingly, as shown at 349, each rule-state definition includes a next-state pointer ("next state") that indicates the location of the subsequent rule-state definition within the SPC memory, meaning that the current state of a rule-tracking state machine may be expressed (and recorded within state memory 345) in the form of a SPC memory address. As the state machine progresses from state to state, the next-state address resident in the rule-state definition for the current state is transferred to the state memory 345 from which it is output to decoder 347 to select the pointed-to rule-state definition to establish the "new" current state.

In addition to the next-state pointer, each rule-state definition 349 includes transition-parameter, back-reference control and state-type fields, each of which feeds into state transition logic 343 to enable progression, re-set and re-entry determinations (e.g., as shown at 309 in FIG. 8). The state-type field indicates the nature of the current search-state and thus the information to be evaluated by state transition logic 343 in determining whether a state progression, re-entry or reset (return-to-idle) is to occur prior to the subsequent search cycle. In the particular embodiment shown, for example, the state-type field is a three-bit field that specifies either an FCS-search state, a word-alternate search state, a character-class search state, a quantifier search state, a back-reference search state, a wait (or null) state, or an acceptance state.

Still referring to rule-state definition 349, the transition parameter field supplies parametric information to state transition logic 343 in accordance with the state type—that is, the state transition logic interprets and applies the content of the transition parameter field in connection with state transition determinations according to the state type. For example, if the state-type field specifies a fixed-pattern character sequence (FCS) search-state, then the transition-parameter field conveys the match index (MI) of the expected FCS—a value known a priori by virtue of the rule parsing operation discussed in reference to FIG. 2. If the state-type field specifies a word-alternate search-state, then the transition-parameter field stores (and outputs) a set of two or more FCS match indices corresponding to the alternatively acceptable character strings. If the state-type field specifies a character-class search state, then the transition-parameter field conveys a character-class identifier (used as discussed below to filter the content of a character-class membership vector). If the state-type field indicates a quantifier search state, the transition-parameter field contains quantifier minimum, maximum values 'm' and 'n', and a flag to indicate an unlimited maximum (n=00), and if the state-type field specifies a back-reference search state, the transition-parameter field identifies the back-reference buffer to be played back (BFid).

Still referring to FIG. 9, the back-reference control field specifies back-reference open and close operations (start-capture, end-capture directives) together with a buffer identifier. In one embodiment, a back-reference "open" operation is executed by administrative logic within state transition logic 343 that allocates a buffer from a buffer storage pool and associates the allocated buffer with the buffer identifier specified by the rule-state definition. The administrative logic also tracks the open-buffer index (which specifies the stored string-length when the buffer is closed and ready for playback)—an approach that beneficially limits the information included in the rule-state definition to that known or determinable when the SPC memory is loaded/updated (i.e., at system start-up or during rule-update installation).

Though not specifically shown in FIG. 9, state transition logic 343 includes a re-entry counter and the aforementioned buffer administrative logic together with combinatorial circuitry for evaluating search/compare results and re-entry count as necessary to make state progression, re-entry and reset determinations. Combinatorial logic may also be provided to generate a rule-match search result, though the mere "acceptance" state-type output from the SPC memory may be sufficient to serve as a rule-match output as that state-type indicates that a rule has been matched.

FIG. 10 illustrates exemplary SPC memory, state transition logic and rule-state memory components (361, 363, 365, respectively) provided to implement a state-machine-based fixed-pattern character search. In the example shown, an FCS match index (or multiple such indices) is delivered by a TCAM-implemented fixed-pattern match engine (i.e., element 161 of rule search memory 153) and the state-machine FCS search is assumed to be allocated to and implemented by a single state machine (SM1) within a pool of four allocable state machines 355. Though not shown, any of the other state machines may be allocated in connection with other active rules so that any number of the state machines may be evaluating the output of fixed-pattern match engine output 161 (i.e., FCS match index "FCS MI") and/or the variable-character match engine output (not shown) in the same search cycle that state machine SM1 determines whether or not the input data content within stream buffer 165 matches the rule-specified (SPC-specified) fixed-pattern character sequence.

In the exemplary implementation shown, state transition logic 363 comprises a multi-bit equality comparator 371 (e.g., bank of XNOR gates) that receives the FCS match index from fixed-pattern match engine 161 as well as the "expected" match index from the current-state-specified rule-state definition (367) within SPC memory 361, asserting an FCS-match signal, "FCmatch," if the two indices match. The FC-match signal and its complement (FCmiss, generated at least conceptually by inverter 373) are supplied to a state-progression input ("prg") and reset input ("rst"), respectively, of rule-state memory 365 to trigger either a progression to the next state (FCS-match) or a reset to idle state (rule mismatch). In the embodiment shown, assertion of the FCmatch signal at the progression input effects a rule-state memory load in which the next-state index from the selected SPC memory entry is written into the rule-state memory as the new state index for state machine SM1 (i.e., $SI_1$)—in effect, advancing the rule-state definition pointer to point to the next SPC entry in the linked list of rule-state definitions that correspond to the rule being tracked. Though not specifically shown, additional circuitry may be provided to qualify the signals supplied to the progression and reset inputs of the rule-state memory. For example, the FCmatch and FCmiss signals may supplied to multiplexing circuitry along with other types of search match/miss signals, with the relevant pair of match/miss signals being output according to the state-type specified in the currently indexed rule-state definition entry. Also, to support word-alternate searches, multiple instances of equality detector 371 may be provided within the state transition logic 363 to compare the TCAM-generated FCS match index with multiple expected match indices that correspond to alternatively acceptable FCS expressions (e.g., with the outputs of the equality detectors logically ORed to generate a word-alternate match signal). Alternatively, a single equality detector may be used to sequentially compare the TCAM-generated FCS match index with each of the match indices corresponding to an alternatively acceptable fixed-pattern character string.

Figure 11:
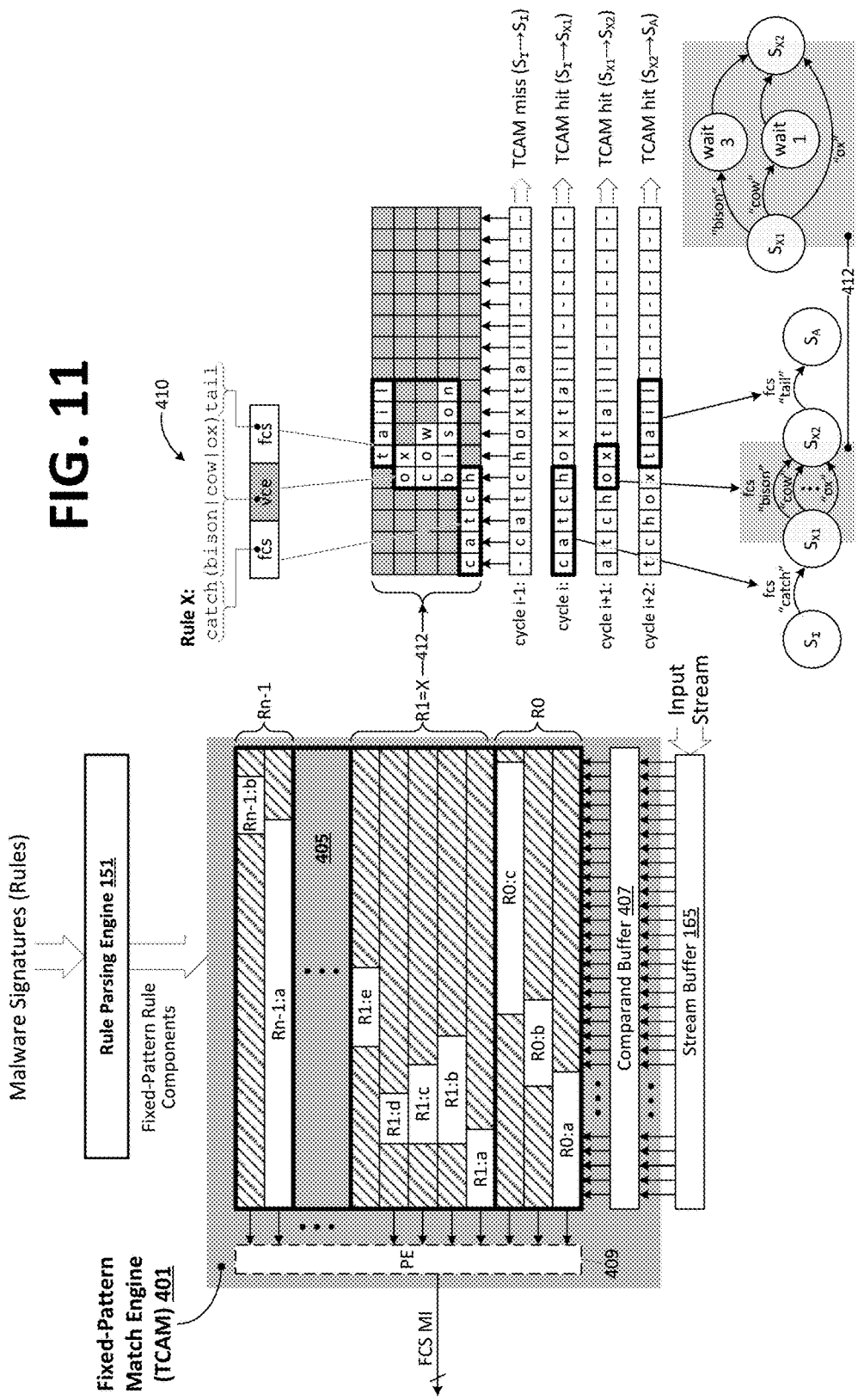
FIG. 11 illustrates an exemplary disposition of fixed-pattern-character-sequence rule segments within a ternary content addressable memory that avoids (reduces) wait-states between success character-string matches.

FIG. 11 illustrates an exemplary disposition of FCS rule segments within TCAM 401—a strategic string loading approach implemented by rule-parsing engine 151 to avoid wait-states between success FCS matches and permit single-cycle search (i.e., parallel and concurrent search within TCAM 401) for word alternates. For ease of understanding, the input data flow direction through the stream buffer is shown right-to-left with TCAM entries left-justified (reversing the data flow direction and entry-justification shown in other drawing figures herein). As shown, FCS expressions within a rule (i.e., character strings that individually constitute FCS segments of a rule or that form alternatives in a word-alternate VCE) are stored within respective TCAM rows at column-offsets defined by the string-length of a prior-expected FCS expression within that same rule. By this arrangement, a match with a multi-character FCS may be followed by another FCS-expression match in the ensuing TCAM search cycle, despite single-character input stream progression (i.e., advancing input data within stream buffer by a single character per search cycle).

In the depicted embodiment, TCAM 401 includes ternary CAM cells 405 arranged in rows and columns, and a comparand buffer 407 coupled to receive input characters from stream buffer 165 and drive constituent bits thereof to columns of the CAM cells. Compare results (match between comparand contents and CAM row contents, after any masking within selected ternary cells—regions indicated by striped patterning) are signaled on respective row-match lines and optionally encoded by a priority encoder 409 (PE) to yield a FCS match index, an address of the highest-priority CAM row that yielded a match.

As shown, exemplary FCS segments of each of 'n' different rules are stored in a string-length-staggered orientation within respective TCAM rows, meaning that a match on any one of the FCS expressions will yield a distinct match index in accordance with the row storage location (i.e., a match index known at time of TCAM loading and thus available to be stored in the transition parameter field of an SPC memory entry). Though depicted as co-located in neighboring rows, FCS segments of a given rule may be dispersed throughout the CAM such that the contents of various rules are intermingled with one another.

Still more specifically to the five (5) FCS components of rule X (R1:a, R1:b, R1:c, R1:d and R1:e) depicted in FIG. 11 and assuming that those FCS components correspond to the three rule segments shown at 410 (i.e., FCS segment "catch," word-alternate VCE segment "bison" or "cow" or "ox," and then FCS segment "tail"), then the segments may be disposed at offset locations shown within detail view 412. That is, "catch" is end-column justified within a row of the CAM array, while "ox," "bison," and "cow" are column-aligned with the final character of "catch," and "tail" is column-aligned with the final character of the shortest of the word alternates and thus with the final character of "ox." By this arrangement, as rule-matching phrase "catchoxtail" propagates through stream buffer 165 (effectively shifting also through TCAM comparand buffer 407), a miss will occur with respect to rule X in each search cycle until cycle 'i'—the cycle executed after the match-phrase advances to the stream buffer location aligned with the TCAM end-column. At this point, a TCAM hit will be signaled with the match index indicating that "catch" has been found, causing a rule-tracking state machine to advance from idle state ($S_I$) to active state $S_{X1}$. Thereafter, the contents of stream buffer 165 (and comparand buffer 407) are shifted forward one character—overlapping the "catch" string by one character and thus aligned to match one of the word-alternate expressions which have been strategically column-offset within the TCAM for that purpose. Accordingly, in search cycle i+1, another TCAM hit is signaled with match index specifying that "ox" has been found. Again, the input stream is advanced by one character so that the next-in-line unmatched character overlaps the final character of "ox" and is aligned with the final FCS expression ("tail") so that TCAM match with "tail" is signaled in search cycle i+2—an event that triggers state-machine transition to acceptance state, $S_A$, so that a rule-match is signaled. Thus, in this example, the entirety of a 11-character string is matched against a three-segment rule in three search cycles.

Still referring to FIG. 11, if the incoming stream contained the longer phrase "catchbisontail" instead of "catchoxtail," the input string "tail" will not be column-aligned with the corresponding TCAM entry immediately after a word-alternate match with "bison." Instead, three additional input stream character-shifts are needed to achieve that alignment—the difference between the string-lengths of the "ox" and "bison" word-alternates. In one embodiment, the rule-tracking state machine accounts for these synchronizing shifts by entering and remaining in a wait state (i.e., a state-type encoded into the a rule-state definition) for a number of search-cycles according to the difference in the string-lengths between a matched word-alternate and a shortest-possible matching word-alternate (e.g., three wait-state cycles for "bison" and one wait-state cycle for "cow"). This approach is shown generally in detail view 414.

Figure 12:
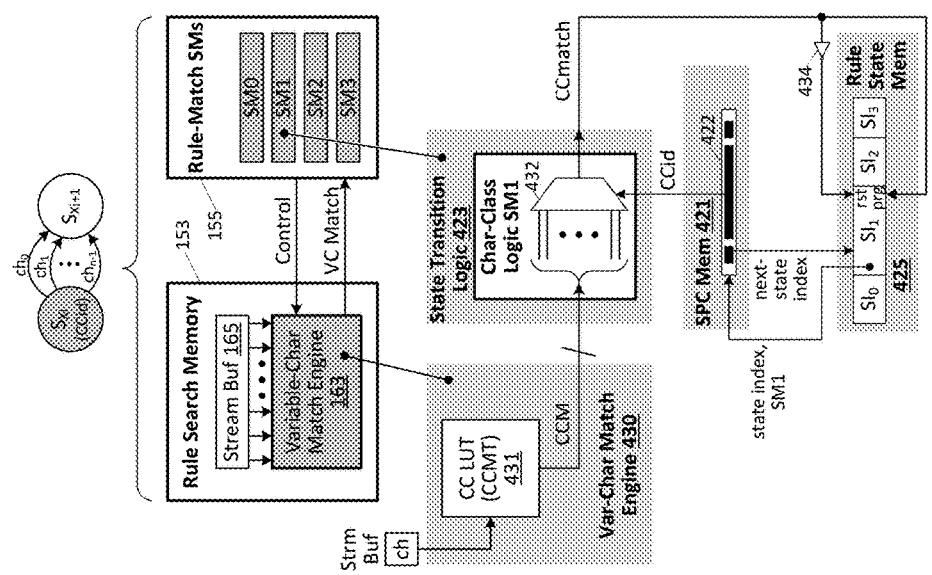
FIG. 12 illustrates components provided within an SPC memory, state transition logic, and rule-state memory to implement a state-machine-based character-class search.

FIG. 12 illustrates components provided within SPC memory 421 (i.e., rule-state definition 422 therein), state transition logic 423, and rule-state memory 425 to implement a state-machine-based character-class (variable-character expression) search. In the example shown, state machine SM1 is allocated to track the rule bearing the character-class segment (one of four allocable state machines though, as in all other embodiments, there may be more or fewer allocable state machines), and variable-character match engine 430 implements a character-class lookup table to provide a character-class search result referred to herein as a character-class membership word (CCM). In one implementation, shown by example in FIG. 13, individual rows of the character-class lookup table 431 correspond to respective characters (all possible characters) in the input data stream, while lookup table columns correspond to respective character classes. Accordingly, by assigning pre-identified character classes within a given rule-set to respective columns of the lookup table and then storing, for each possible input character, a character-class membership word containing logic '1' bits in the columns corresponding to the character-classes of which the input character is a member, it becomes possible to lookup the character class membership for each input character—yielding an n-bit membership word, CCM[n−1:0], in which membership in a given character class is signified by a logic '1' in the corresponding bit position (i.e., column offset). The applicable set of character classes may be inventoried during initial/supplemental rule parsing, and assigned respective columns within the membership lookup table, with the table memory having a sufficient number of columns to handle foreseeable rule-sets. In one embodiment, for example, the membership table includes sufficient columns to store a 128 bit membership word (i.e., up to 128 character classes per rule-set), with the specific character-classes being assigned to columns during rule-parsing.

In the embodiment of FIG. 12, an entire membership word is read out of the character-class lookup table in response to each incoming character ("ch") and supplied to state transition logic 423 to enable character-class membership confirmation in accordance with rule requirements. In the depicted implementation, for example, the transition parameter field of rule-state definition 422 (i.e., the rule-state definition for a character-class search state within the rule being tracked by SM1) indicates that the input character under evaluation is to be a member of a character class specified by character-class identifier, CCid—an index that corresponds to a character-class column within the character-class lookup table and thus a column offset within the character-class membership word read out of lookup table 431. As shown, the SPC-stored CCid is output to state-transition logic 423 (together with a state-type indicating a character-class membership determination) and used to select, as the character-class match signal, a bit from the character class membership word in the CCid column. Thus, if the subject input character "ch" is a member of the SPC-specified character-class, the logic '1' in the input-character-indexed membership word will confirm that membership by driving the CCmatch output from multiplexer 432. That is, CCmatch=CC-LUT[ch, CCid]. As in the FCS search example, the character-class match signal is supplied to the progression (load next state index) input of the rule-state memory entry for the rule-tracking state machine and its complement (character-class mismatch generated by inverter 434) is supplied to the reset input of the rule-state memory entry. Accordingly, character-class match (membership) will yield progression to the subsequent rule-search state, and character-class mismatch will trigger a reset, terminating the active rule and idling the rule-tracking state machine.

Figure 13:
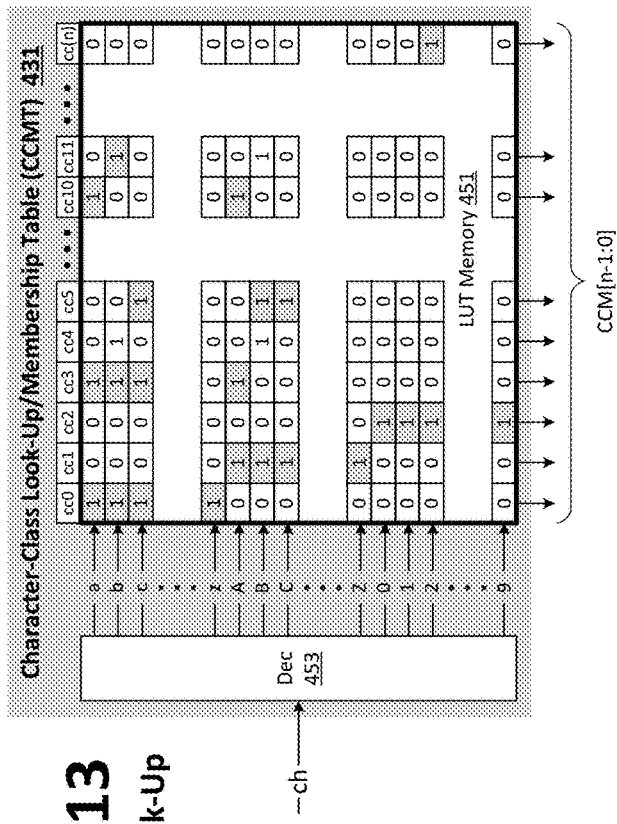
FIG. 13 illustrates an embodiment of character-class lookup table.

FIG. 14 illustrates an exemplary sequence of operations that may be executed to populate the character-class lookup table of FIG. 13. Starting at 471, distinct character classes in the input rule set or rule update are identified and assigned respective character class indices corresponding to respective columns of the character-class membership table. At 473, a loop is initiated to sequence a character variable (ch) through each possible input character, followed by a nested loop at 475 to sequence a character class index (cc) through each assigned character class. Within inner loop 475, character "ch" is evaluated for membership in the character class specified by the character class index—an operation that may be carried out by character by character comparison between "ch" and a separate character-class database containing all the characters in the identified character class. If the character in question is a member of the indexed character class (affirmative determination at 477, a character class membership word corresponding to the character (i.e., a row of the character-class membership table indexed by the character) is updated to include a set bit (e.g., a logic '1') in the column position corresponding to the character-class index. That is, an assignment CC-LUT[ch, cc]=1 is carried out as shown at 479, where CC-LUT is the character-class membership table, and CC-LUT[ch, cc] refers to table row 'ch' and column offset 'cc'. That same bit is cleared at 481 if the character is not a member of the indexed character class.

FIG. 15 illustrates elements provided within an SPC memory 501 (i.e., a rule-state definition therein), state transition logic 503 and rule-state memory 505 to implement a state-machine-based quantifier (variable-character expression) search. In the example shown, state machine SM3 is allocated to track the rule bearing the quantifier rule segment (leaving other state machines free to track other rules), and the indexed SPC entry (rule-state definition 502) specifies a quantifier state-type together with transition parameters that define the quantified operand and minimum/maximum instance counts. More specifically, in this generalized {m, n} quantification example, the transition parameters specify a minimum number 'm' of match instances required with respect to an expected match index (the match index corresponding to the quantified operand), a maximum number 'n' of match instances permitted with respect to the expected match index and a flag to indicate whether the maximum is unlimited ("n==∞"). The operand instance count is assumed to start from zero in the depicted embodiment, so the minimum and maximum instance limits are reduced by one.

Still referring to FIG. 15, rule-state transition logic 503 includes a re-entry counter 513, min/max threshold comparators 515 and 517, logic AND gate 519 together with a quantifier logic circuit 521. Quantifier logic 521 generates state-progression and reset signals based on (i) comparison of the search-generated match index with the expected match index and (ii) whether the re-entry count (an indicator of the number of operand instances detected) exceeds the minimum threshold (a circumstance signaled by comparator 515) or maximum threshold (signaled by comparator 517). More specifically, the quantifier logic implements the two progression criteria shown within the quantifier search state depicted at 522 (e.g., as discussed above in FIG. 6) as well as the state re-entry path, with the latter effected by non-assertion of the state-transition signals, progress and reset. Thus, if the search-generated match index and expected match indices match one another ("operand matched") and the maximum re-entry count (n−1) has not been reached (an always-true condition when flag n==∞ is asserted, by virtue of AND gate 519), then, quantifier logic 521 deasserts the progress and reset signals to effect a state re-entry operation. By contrast, if the operand is found (matched search and expected indices) and the maximum re-entry count has been reached, quantifier logic will assert the progress signal to effect a state progression in accordance with a first of the two quantifier state progression paths (i.e., "x & c(t==n−1)"). If the expected and search-generated indices do not match (operand miss) and the re-entry counter is equal to or greater than the minimum re-entry count (i.e., minimum number of operand instances found), then the second of the two quantifier-state progression criteria is satisfied—the special null-search case discussed above in which the search-generate index (corresponding to the head-of-queue character within the stream buffer) is to be reevaluated in the subsequent search state. In that case, quantifier logic 521 asserts the progress signal to load rule-state memory 505 with the SPC pointer to the rule-state definition for the subsequent search state, and also asserts a hold signal ("hold") that is applied to suppress input stream advance within the stream buffer, effectively causing the same head-of-queue character to be re-evaluated in the next search-state. Hold signal assertion may also suppress search operation within the fixed-pattern character search engine and variable-character search engine to save power, with the match index generated in the most recently executed search being latched or otherwise persisting for re-use in the new search-state. Staying with the quantifier search-state, if the state reentry criteria is not met and neither of the progression criteria are met, quantifier logic 521 asserts the reset signal ("reset") to render the rule-tracking state machine back to the idle (deallocated) state, terminating the rule-tracking operation. As discussed in connection with other search-states discussed above, additional logic may be provided to select the progress/reset signals from a respective logic block according to the state-type specified by the indexed rule-state definition within the SPC memory 501. For example, a multiplexer (not shown) may be provided to select quantifier logic 521 to source the progress and reset signals in response to the quantifier state-type specified by rule-state definition 502, and to select other rule-state transition logic elements (e.g., for FCS match, word-alternate match, character-class match, etc.) for other search-state types.

FIG. 16 illustrates an exemplary sequence of back-reference data capture operations executed by a rule-tracking state machine at each new state entry in which the input data stream is advanced (e.g., all state progressions other than a null-search progression from a quantifier search state). Starting at decision point 531, if the indexed SPC memory entry for a given search state (i.e., the rule-state definition) indicates a start-capture operation, then a back-reference buffer is allocated at 533 and marked by an SPC-provided identifier. In one embodiment, for example, a buffer ID value "bfid" is generated by concatentating the SPC-provided identifier (e.g., an ordinal buffer number, bufnum, specific to the backreferencing rule) with a rule-tracking state machine identifier (SMid) to form a buffer ID tuple (i.e., bfid=bufnum|SMid), allocating buffer memory (mem-alloc bfid.buf[ ]), setting the buffer status to open (bfid.status=open) and clearing the buffer fill index (bfid-.fill=0). Thereafter, at 535, the head-of-queue input stream character (ch) is loaded into each open buffer and the corresponding buffer fill index is incremented (bfid.fill++). By this operation the fill index for each open buffer indicates the length of the string recorded up to that point in the input stream progression.

Continuing with FIG. 16, if the indexed SPC entry indicates an end-capture operation for a specific buffer identifier (affirmative determination at 537), the status for that buffer is changed to "closed" as shown in 539. At this point, the subject buffer remains allocated on behalf of the rule-tracking state machine and the fill index indicates the length of the recorded character string. If the indexed SPC entry specifies a back-reference playback (i.e., back-reference search state) and the rule-state transition logic determines that the re-entry count within the back-reference search state has indexed to the final character within the buffered string (i.e., final playback complete and thus affirmative determination at 541), the buffer status is set to null and buffer storage is deallocated as shown at 543.

FIG. 17 illustrates elements provided within SPC memory 561, state transition logic 563, and rule-state memory 565 to enable state-machine-controlled back-reference capture and playback operations. In the example shown, an available state machine (SMn) is allocated to track segment-match progress within a rule bearing back-reference capture and playback directives. When an SPC entry 567 having a start-capture directive is encountered, a buffer identifier (e.g., "bfid," formed by a tuple between an SPC-supplied buffer number and the identifier of the rule-tracking state machine) is supplied to rule-state transition logic 563 to trigger buffer allocation and status update operations. In the depicted embodiment, for example, rule-state transition logic 563 includes a pool of buffer management objects 581, back-reference logic circuitry 583, re-entry counter 585 and a set of index selectors 587. Each buffer management object 581 is associated with a respective storage buffer 571 (the "buffer") within variable-character match engine 570 (e.g., dynamically allocated from a unified memory or a pool of discrete buffer elements) and includes registers to store the buffer ID ("bfid"), a buffer status value ("status") and a buffer-fill index ("fill"). Each buffer management object is also associated with a respective index selector 587, supplying the buffer-fill index thereto. Back reference logic 583 outputs an index selection signal 586 to the index selector for each allocated buffer management object 581 to enable either the buffer-fill index from that management object, or a state re-entry count from counter 585 to index into the corresponding buffer.

Though not specifically shown, additional allocation circuitry may be provided within rule-transition logic 563 to manage allocation of buffer management objects 581 and corresponding buffers 571 in response to a start-capture directive from an indexed SPC entry and to enable status updates (open, close, release) with respect to such buffer allocation. When a start-capture directive is signaled by an SPC entry (e.g., rule-state definition 567), the allocation circuitry allocates both a buffer 571 and buffer management object 581, loads the incoming buffer ID into the management object 581 and updates the status and full index fields of that object to reflect an open, empty buffer (i.e., status="open" and fill index=0). The buffer status and fill index from each management object 581 are supplied to back-reference logic 583 to enable back-reference logic to control operation of selectors 587 and compare the re-entry count from counter 585 with a buffer fill-index. More specifically, for each open allocated buffer (bfid not null, status=open), back-reference logic 583 selects (through selection signal 586 and selector 587) the fill-index from the corresponding buffer management object 581 to index (point) into a particular buffer and thus enable buffer loading (i.e., incrementing the fill index after each character load operation). For each closed buffer, back reference logic 583 drives selection signal 586 to the opposite state to select the re-entry counter as the index into the buffer thus enabling progression through the buffer contents in successive re-entries into a back-reference search state. By this operation, in each search-state following a start-capture directive (including the search-state bearing the start-capture directive), each open buffer for each active rule-tracking state machine is loaded with the head-of-queue input character at the storage location indicated by the fill index for that particular buffer (with ensuing increment to the fill index).

Still referring to FIG. 17, when a rule-state definition bearing an end-capture directive is encountered within SPC memory 561, the buffer status for the identified buffer is changed to "closed" to cancel further buffer loading and suppress further increment to the fill index. At this point the buffer is ready for playback and the fill index indicates the length of the string stored therein.

When a rule-state definition 569 containing a back-reference search state is encountered within SPC memory 561 (i.e., state-type=bkrf), a buffer number within the SPC transition parameter field is combined with the rule-tracking state machine ID to form a buffer ID that specifies a particular buffer for playback, including selecting the fill index for that buffer to feed a string-length input of the back-reference logic and thus enable comparison with the re-entry counter as characters within the subject buffer are compared one after another with input stream content (i.e., with re-entry counter 585 sequencing the buffer readout index in view of the closed state of the buffer). By this operation, when the back-reference search state is initially entered (re-entry count=0) the first character stored within the buffer (i.e., at buffer location bfid.buf[0]) is supplied to comparator 573 for comparison with the head-of-queue input character. If a match is detected, back-reference logic 583 increments the re-entry count and compares that count with the buffer fill index to determine whether the complete buffered string has been matched (i.e., whether re-entry count has reached fill index). If the complete buffered string has been matched, back-reference logic 583 asserts a progress signal to advance the rule-tracking state machine to the next search state (i.e., next-state index to be loaded into rule-state memory 585). If a character match is detected with respect to a nonfinal character of the buffered string (i.e., reentry count less than fill index), match engine 570 will deassert both the progress and reset signals to effect re-entry to the back-reference search state for evaluation of a subsequent input character. A back-reference mismatch signaled by variable character match engine 570 (i.e., indicating mismatch between input character and buffered character) indicates mismatch with respect to the subject rule as a whole so that back-reference logic 583 will assert the reset signal ("rst") to render the rule-tracking state machine back to the idle (deallocated) state. In that case, all back-reference buffers and buffer management objects allocated on behalf of the rule-tracking state machine will be freed for subsequent reallocation. As discussed in reference to FIG. 16, a given back-reference buffer and management object may also be freed upon confirming back-reference match in a final playback of a particular buffer (a circumstance known a prior when the SPC memory is initially populated or later updated). Alternatively, buffers allocated on behalf of a given rule-tracking state machine may be freed upon conclusion of the rule-match operation, whether the result be positive (rule-match signal asserted) or negative.

Figure 18:
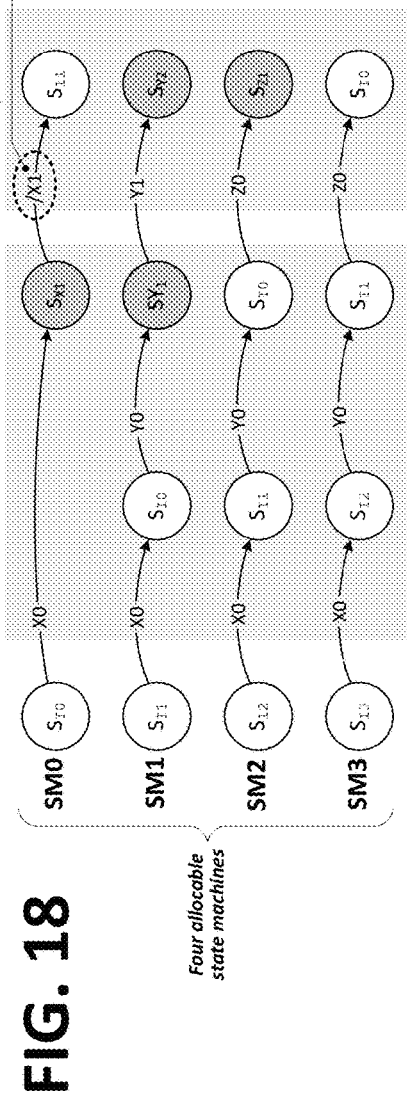
FIG. 18 illustrates an exemplary state machine allocation approach that may be implemented within the rule search engine embodiments discussed in reference to FIGS. 2-17.

FIG. 18 illustrates an exemplary state machine allocation approach that may be implemented within the rule search engine embodiments discussed above. In the depicted embodiment, idle state machines are allocated in an order according to a next-to-allocate count—a count value that is counted down for each idle state machine in response to each allocation event until a given state machine becomes next-in-line for allocation. By this operation, a rotating queue of state machines is made available for allocation, with those most recently allocated and then idled being added to the back of the queue.

Still referring to FIG. 18, in the initial condition following search cycle 'i' in which all four allocable state machines SM0-SM3 (there may be more or fewer in alternative embodiments) are idle, their respective idle states are qualified by an next-to-allocate count so that the SM0 state is $S_{I0}$, the SM1 state is $S_{I1}$ and the states of SM2 and SM3 are $S_{I2}$ and $S_{I3}$—that is, the subscripts "I0", "I1", "I2", etc. indicate respective idle states with next-to-allocate counts of 0, 1, 2, etc. When matches between the input stream and initial segments of rules X and Y (i.e., X0 and Y0) are detected in search cycle i+1, the state machine having the lowest next-to-allocate count (i.e., SM0 having state $S_{I0}$) is allocated to track rule X, while the next-to-allocate counts for the remaining state machines are decremented. Accordingly, after SM0 has been allocated (and transitions to $S_{X1}$), SM1 has the lowest next-to-allocate count ($S_{I0}$) and is thus allocated to track rule Y. Note that this operation may involve decrementing the next-to-allocate counters for unallocated state machines multiple times with respect to a given search cycle (e.g., as many times as anticipated to be the maximum number of different rule starting segment matches that may occur with respect to a given rule set). In any case, at the conclusion of search cycle i+1, state machines SM0 and SM1 have been allocated to track rules X and Y (and thus are in states SX1 and SY1, respectively), while state machines SM2 and SM3 remain idle and have next-to-allocate counts of 0 and 1, respectively. Assuming a match failure during ensuing search cycle i+2 with respect to rule-X segment X1, and an affirmative match with respect to expected rule Y segment Y1 and also an affirmative match with respect to initial rule Z segment Z0, then the next-to-allocate state machine SM2 is allocated to track rule Z (transitioning to state $S_{Z1}$), while the next-to-allocate count for SM3 is decremented to zero ($S_{I0}$). The rule-X mismatch yields a reset of SM0, returning that state machine to the idle state with a next-to-allocate count one behind SM3 (i.e., $S_{I1}$). At this point, state machines SM1 and SM2 are allocated and tracking active rules Y and Z, while state machines SM3 and SM0 are idle and ready to be allocated in that order.

Figure 19:
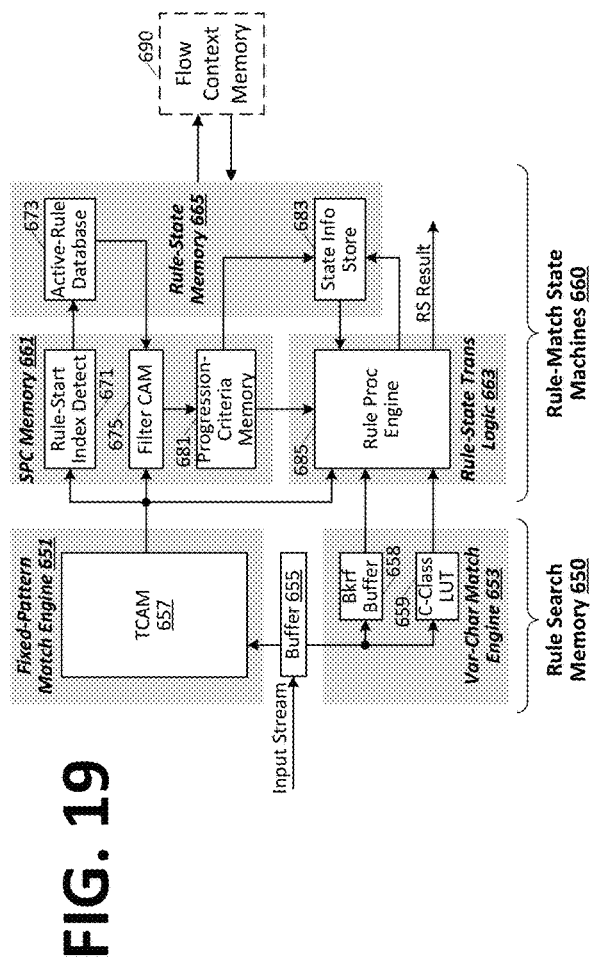
FIG. 19 illustrates more detailed embodiments of a rule search memory and rule-match state machines that may be used to implement like-named components of the rule search engine depicted in FIG. 2.

FIG. 19 illustrates more detailed embodiments of a rule search memory 650 and rule-match state machines 660 that may be used to implement like-named components of the rule search engine depicted in FIG. 2. Within rule search memory 650, a fixed-pattern match engine 651 is implemented by a ternary CAM (TCAM) 657, while a variable-character match engine 653 is implemented by a back-reference buffer pool 658 (e.g., as described in reference to FIG. 16) in combination with a character-class look-up table 659 (e.g., described in reference to FIG. 13). The rule-match state machines 660 are formed by the same general components described above and include SPC memory 661, rule-state transition logic 663 and rule-state memory 665. As shown, SPC memory 661 includes a rule-start index detector 671 to determine when the initial segment of a rule has been found and, in that case, store an index corresponding to that rule within an active-rule database 673—a component of rule-state memory 665. The indices within active rule database 673 are supplied to a filter CAM 675 within the SPC store—a content addressable memory that contains match indices corresponding to all rules in the rule-set, but limits rule-state tracking actions to active rules (i.e., marked by indices from the active rule database). In one embodiment, the filter CAM responds to a TCAM match index/active-rule tuple (i.e., rule index from active rule database and match index from TCAM) by outputting a corresponding index to an "progression-criteria memory" 681 containing rule-state definition information—that is next-state, transition parameters, state type and back-reference control information. In the depicted embodiment, the next-state information is supplied to a state-information storage 683 (which records the current rule-tracking state and thus constitutes part of rule-state memory 665) while the transition parameters, state type and back-reference controls are supplied to a rule processing engine 685. The rule-processing engine responds to the incoming state-definition information (state type, transition parameters and back-reference controls) by evaluating the TCAM match index, character-class membership lookup, and back-reference buffer output to yield progression control signals (loading the state information store with a new rule-state from the indirection memory, or resetting the state information store to reflect an idle state) and a rule-search result. These rule-state transition determinations may be carried out by logic elements generally as shown above with respect to various search-state types (e.g., fixed-pattern character sequence, quantifier, character-class, word-alternate, back-reference).

Still referring to FIG. 19, a flow-context memory 690 may be provided to facilitate flow-switching within the malware detection system. In one embodiment, for example, a switch from a first traffic flow to a second (distinct) traffic flow is signaled by a flow detection/tracking unit within the control plane of the ingress or egress security engine (e.g., as described in reference to FIG. 1) to trigger a context switch within the malware detection module. For example, the malware detection module may execute a memory-flush operation in which contents of rule-state memory 665 (e.g., contents of active-rule database 673 and state-information store 683) are transferred to a flow-context buffer within flow-context memory 690 (thus recording the search state of the first flow), while any previously recorded context of the second flow is retrieved from another buffer within the flow-context memory. By this operation, the malware detection may be switched dynamically between different flows, with active rule search states corresponding to a given flow being seamlessly restored within the rule-state memory 665. Flow context memory 690 and/or rule-state memory 665 may be dual ported (or multi-ported) to permit simultaneous context storage and retrieval.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

Any of the various methodologies disclosed herein and/or user interfaces for configuring and managing same may be implemented by dedicated hardware and/or machine execution of one or more sequences of instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 1. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, the term "engine" or "logic engine" as used herein refers broadly to one or more components implemented by dedicated hardware, programmed processor(s), or any combination of dedicated hardware and programmed processor(s). Any of the specific memory or storage sizes, signal path widths, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Device or component "programming" can include, for example and without limitation, loading a control value into a register or other storage circuit within the device or component in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device or component. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An apparatus to protect against malware propagation within a data-transmission network, the apparatus comprising:
    a ternary content addressable memory (TCAM) to store fixed-pattern character sequences that correspond to fixed-character segments of malware signatures and to detect matches between an input data stream and the fixed-pattern character sequences;
    variable-character-expression match circuitry to store variable-character expressions that constitute variable-expression segments of the malware signatures and to detect matches between the input data stream and the variable-character expressions; and
    state machine circuitry to:
        receive match detection signals from the TCAM and the variable-character-expression match circuitry indicative of matches with respect to the fixed-pattern character sequences and variable-character expressions, respectively, the match detection signals including at least one match detection signal from the TCAM and at least one match detection signal from the VCE match circuitry;
        track segment-by-segment detection of any one of the malware signatures in response to the match detection signals from the TCAM and the variable-character-expression match circuitry until the match detection signals indicate a match with respect to a final segment of the one of the malware signatures; and
        output a malware notification in response to indication of the match with respect to the final segment.

2. The apparatus of claim 1 further comprising management circuitry to receive the malware notification from the state machine circuitry and, in response to the malware signature notification, to perform at least one of the following actions: block the input data stream, divert the input data stream to an alternative destination, or log information with respect to the input data stream.

3. The apparatus of claim 1 wherein the TCAM and the variable-character-expression match circuitry operate concurrently to detect input-data-stream matches with respect to the fixed-pattern character sequences and the variable-character expressions, respectively.

4. The apparatus of claim 1 wherein the state machine circuitry to track segment-by-segment detection of any one of the malware signatures comprises circuitry to enable match detection operation within the variable-character-expression circuitry in response to one or more of the match detection signals from the TCAM.

5. The apparatus of claim 4 wherein the circuitry to enable match detection operation within the variable-character-expression circuitry in response to one or more of the match detection signals from the TCAM comprises circuitry to determine that a segment of the one of malware signatures for which the TCAM has signaled a match detection is succeeded, within the one of the malware signatures, by a variable character expression.

6. The apparatus of claim 1 further comprising rule-parsing circuitry to receive a plurality of malware signatures and, in response, populate the TCAM with the fixed-pattern character sequences and populate the variable-character-expression match circuitry with the variable-character expressions.

7. The apparatus of claim 6 wherein the rule-parsing circuitry segments the plurality of malware signatures into the fixed-pattern character sequences and the variable-character-expression according to contents of the plurality of malware signatures.

8. The apparatus of claim 6 wherein at least one of the state machine circuitry and the variable-character-expression match circuitry comprises a programmed processor.

9. A method of operation within a malware detection apparatus that receives an input data stream from a data-transmission network, the method comprising:
    detecting matches, within a ternary content addressable memory (TCAM), between the input data stream and fixed-pattern character sequences that correspond to fixed-character segments of malware signatures;
    detecting matches, within variable-character-expression match circuitry, between the input data stream and variable-character expressions that constitute variable-expression segments of the malware signatures;
    tracking segment-by-segment detection of any one of the malware signatures in response to one or more match detections within the TCAM and one or more match detections within the variable-character-expression match circuitry until a match detection is indicated by the TCAM or variable-character-expression match circuitry with respect to a final segment of the one of the malware signatures; and
    outputting a malware notification in response to indication of the match with respect to the final segment.

10. The method of claim 9 further comprising performing at least one of the following actions in response to the malware notification: blocking the input data stream, diverting the input data stream to an alternative destination, or logging information with respect to the input data stream.

11. The method of claim 9 wherein detecting matches between the input data stream and the fixed-pattern character sequences and between the input data stream and the variable-character expressions comprises concurrently detecting matches within the TCAM and the variable-character-expression match circuitry.

12. The method of claim 9 wherein tracking segment-by-segment detection of any one of the malware signatures comprises enabling match detection operation within the variable-character-expression circuitry in response to match detection within the TCAM.

13. The method of claim 12 wherein the enabling match detection operation within the variable-character-expression circuitry in response to match detection within the TCAM comprises determining that a segment of the one of malware signatures for which the TCAM detected a match is succeeded, within the one of the malware signatures, by a variable character expression.

14. The method of claim 9 further comprising receiving a plurality of malware signatures and, in response, loading the TCAM with the fixed-pattern character sequences and loading the variable-character-expression match circuitry with the variable-character expressions.

15. The method of claim 14 wherein loading the TCAM and the variable-character-expression match circuitry in response to receiving the plurality of malware signatures comprises segmenting the plurality of malware signatures into the fixed-pattern character sequences and the variable-character-expression according to contents of the plurality of malware signatures.

16. The method of claim 14 wherein at least one of match detection within the variable-character-expression match circuitry and tracking segment by segment detection of any one of the malware signatures comprises instruction execution within a processor.

17. A malware detection apparatus comprising:
a ternary content addressable memory (TCAM) to store fixed-pattern character sequences corresponding to fixed-pattern segments of malware rules;
variable-character-expression match circuitry comprising memory to store variable-character expressions corresponding to variable-character expression segments of the malware rules; and
an input stream buffer coupled to receive an input traffic stream and provide contents of the input traffic stream to each of the TCAM and the variable-character-expression match circuitry, wherein the TCAM and the variable-character-expression match circuitry concurrently search the contents of the input traffic stream for instances of malware represented by the malware rules, including iterative searching within the TCAM for respective fixed-pattern segments of at least one of the malware rules.

18. The malware detection apparatus of claim 17 further comprising state machine circuitry to track segment-by-segment detection of any one of the malware instances in response to match detection signals from the TCAM and variable-character-expression match circuitry.

19. The malware detection apparatus of claim 17 further comprising a rule parsing engine to:
receive the malware rules;
resolve each of the malware rules into an ordered sequence of rule segments that include the fixed-pattern segments and variable-character expression segments;
load into the ternary content addressable memory the fixed-pattern character sequences corresponding to the fixed-pattern segments; and
load into the memory of the variable-character match circuitry the variable-character expressions corresponding to the variable-character expression segments.

20. The malware detection apparatus of claim 17 further comprising management circuitry to perform at least one of the following actions with respect to the input traffic stream in response to determination, based at least in part on search results from the fixed-pattern match circuitry and the variable-character-expression match circuitry, that the input traffic stream contains a malware instance: block the input traffic stream, divert the input traffic stream to an alternative destination, or log information with respect to the input traffic stream.

* * * * *